United States Patent
Maleki et al.

(10) Patent No.: US 12,335,870 B2
(45) Date of Patent: Jun. 17, 2025

(54) POWER SAVING SIGNAL MONITORING OCCASIONS CONFIGURATION AND CAPABILITY SIGNALING

(71) Applicant: Telefonaktiebolaget LM Ericsson (publ), Stockholm (SE)

(72) Inventors: Sina Maleki, Malmö (SE); Ajit Nimbalker, Fremont, CA (US); Ravikiran Nory, San José, CA (US); Andres Reial, Höllviken (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 632 days.

(21) Appl. No.: 17/774,811

(22) PCT Filed: Nov. 6, 2020

(86) PCT No.: PCT/EP2020/081323
§ 371 (c)(1),
(2) Date: May 5, 2022

(87) PCT Pub. No.: WO2021/089801
PCT Pub. Date: May 14, 2021

(65) Prior Publication Data
US 2022/0394616 A1    Dec. 8, 2022

Related U.S. Application Data

(60) Provisional application No. 62/933,155, filed on Nov. 8, 2019.

(51) Int. Cl.
*H04W 52/02* (2009.01)
*H04W 76/28* (2018.01)

(52) U.S. Cl.
CPC ... *H04W 52/0229* (2013.01); *H04W 52/0216* (2013.01); *H04W 76/28* (2018.02)

(58) Field of Classification Search
CPC ......... H04W 52/0229; H04W 52/0216; H04W 76/28; H04W 76/20; H04W 76/27; Y02D 30/70
See application file for complete search history.

(56) References Cited

U.S. PATENT DOCUMENTS

| | | |
|---|---|---|
| 2019/0342833 A1 | 11/2019 | Åström et al. |
| 2021/0014791 A1 | 1/2021 | Freda et al. |

(Continued)

FOREIGN PATENT DOCUMENTS

CN    109792364 A    5/2019

OTHER PUBLICATIONS

International Search Report and Written Opinion dated Feb. 16, 2021 in International Application No. PCT/EP2020/081323 (11 pages).

(Continued)

*Primary Examiner* — Kyaw Z Soe
(74) *Attorney, Agent, or Firm* — Rothwell, Figg, Ernst & Manbeck, P.C.

(57) ABSTRACT

There is provided a method (500) performed by a wireless device (WD) for communicating with a network node in a wireless communication network. The method comprises configuring (401) the WD with a Discontinuous Reception (DRX) configuration having an ON-duration configuration and a long/short DRX cycle configuration, the DRX configuration defining a timing and a length of an ON-duration for the WD based on a message from the network node. The method further comprises configuring (402) the WD with a Power Saving Signal (PSS) configuration based on a message from the network node, wherein the PSS configuration comprises a PSS offset and a PSS range, and where the PSS offset and the PSS range define a starting point and length of a PSS Monitoring Window (MW) within which at least one (Continued)

PSS Monitoring Occasion (MO) occurs. Further, the method comprises monitoring (403) a signal or channel at one or more PSS MOs within the PSS MW. There is also provided a corresponding wireless device (121) for communicating with a network node, a method (600) perform by a network node, and a network node (110).

26 Claims, 13 Drawing Sheets

(56) References Cited

U.S. PATENT DOCUMENTS

| | | | |
|---|---|---|---|
| 2021/0234657 A1* | 7/2021 | Miao | H04W 52/028 |
| 2023/0300742 A1* | 9/2023 | He | H04L 5/0098 |
| | | | 370/311 |

OTHER PUBLICATIONS

Catt, "Offline Discussion Summary of PDCCH-based Power Saving Signal/Channel", 3GPP TSG RAN WG1 Meeting #98bis, R1-1911620, Chongqing, China, Oct. 14-20, 2019 (41 pages).

Huawei et al., "PDCCH-based power saving signal/channel", 3GPP TSG RAN WG1 Meeting #98bis, R1-1910076, Chongqing, China, Oct. 14-20, 2019 (21 pages).

Ericsson, "Design of PDCCH-WUS", 3GPP TSG-RAN WG1 Meeting #99, Tdoc R1-1912780, Reno, USA, Nov. 18-22, 2019 (13 pages).

* cited by examiner

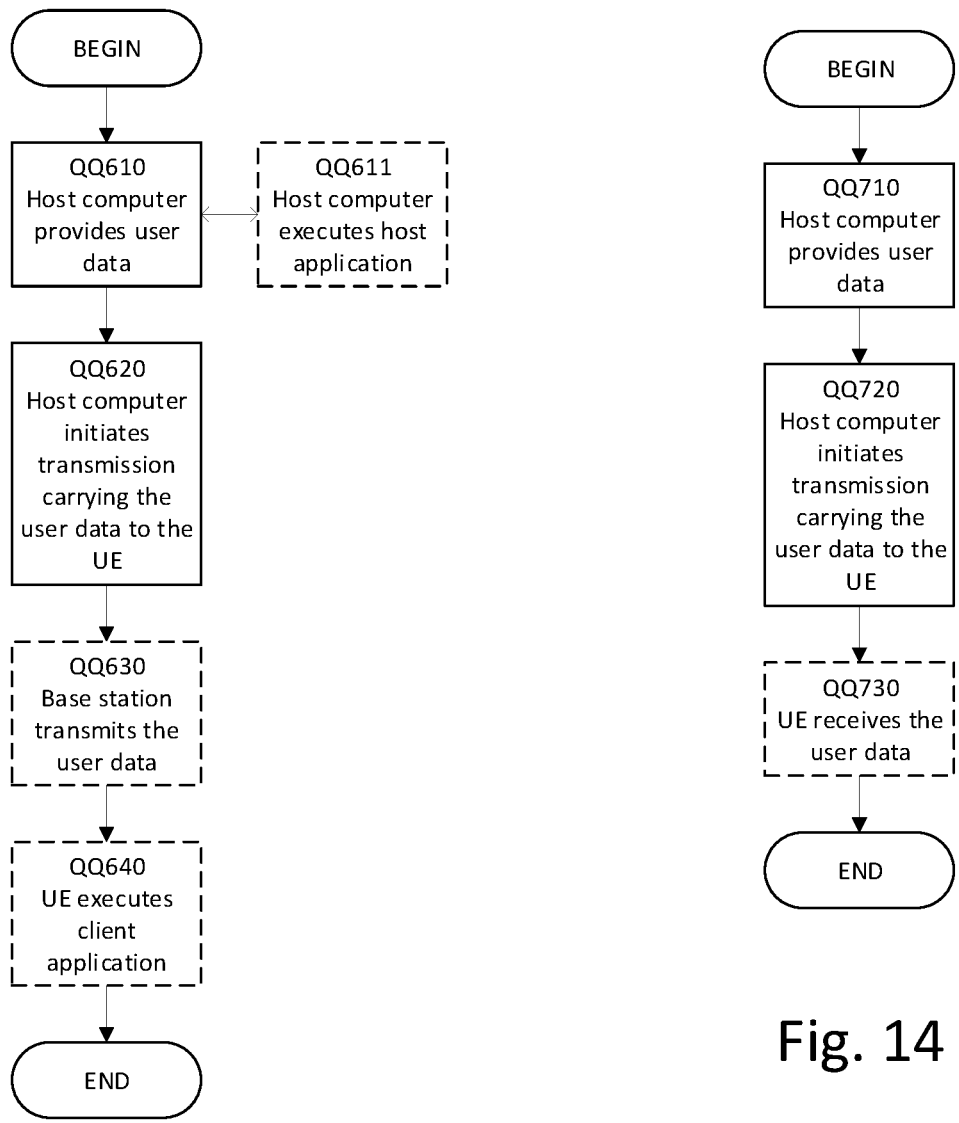

POWER SAVING SIGNAL MONITORING OCCASIONS CONFIGURATION AND CAPABILITY SIGNALING

CROSS REFERENCE TO RELATED APPLICATION(S)

This application is a 35 U.S.C. § 371 National Stage of International Patent Application No. PCT/EP2020/081323, filed Nov. 6, 2020, which claims priority to U.S. provisional application No. 62/933,155, filed on Nov. 8, 2019. The above identified applications are incorporated by this reference.

TECHNICAL FIELD

The present disclosure relates to wireless communications, and in particular, to configurations of Power Saving Signal (PSS) Monitoring Occasions (MO) and capability signaling.

BACKGROUND

The Third Generation Partnership Project (3GPP) has developed and is developing standards for Fourth Generation (4G) (also referred to as Long Term Evolution, LTE) and Fifth Generation (5G) (also referred to as New Radio, NR) wireless communication systems. Such systems provide, among other features, broadband communication between network nodes, such as base stations, and mobile wireless devices (WDs), as well as communication between network nodes and between WDs. The non-limiting terms wireless device (WD) or a user equipment (UE) are used interchangeably herein.

In the 3GPP RAN1. UE Power Saving Study Item, Physical Downlink Control Channel (PDCCH) based power saving signal (PSS) is agreed as a technique to improve UE power consumption. The agreed PDCCH based power saving signal is associated with the conventional Continuous Mode Discontinuous Reception (C-DRX). PDCCH based Power Saving Signaling (PSS) is particularly considered as an efficient realization of this agreement.

The general idea of PSS is to send a power saving signal before the ON duration of C-DRX in case the Network (NW) would like to wake-up the UE for that ON duration, and upon detection of the PSS, the UE must wake-up and e.g., monitor PDCCH in the next ON duration.

New radio (NR) standard in 3GPP is being designed to provide service for multiple use cases such as enhanced Mobile Broadband (eMBB), Ultra-Reliable And Low Latency Communication (URLLC), and Machine Type Communication (MTC). Each of these services has different technical requirements. For example, the general requirement for eMBB is high data rate with moderate latency and moderate coverage, while URLLC service requires a low latency and high reliability transmission but perhaps for moderate data rates.

One of the solutions for low latency data transmission is shorter transmission time intervals. In NR in addition to transmission in a slot, a mini-slot transmission is also allowed to reduce latency. A mini-slot may consist of any number of 1 to 14 Orthogonal Frequency Division Multiplexing (OFDM) symbols. It should be noted that the concepts of slot and mini-slot are not specific to a specific service meaning that a mini-slot may be used for either eMBB, URLLC, or other services.

UE power consumption is an important metric that needs to be enhanced. In general, significant power can be spent on monitoring the PDCCH in LTE, based on one DRX setting from LTE field logs. The situation can be similar in NR if similar DRX setting with traffic modelling is utilized, as the UE needs to perform blind detection in its configured control resource sets (CORESETs) to identify whether there is a PDCCH sent to it, and act accordingly. Techniques that can reduce unnecessary PDCCH monitoring or allowing UE to go to sleep or wake-up only when required are desirable.

However, there are currently a number of challenges associated with the details of the underlying Monitoring Occasion (MO) configurations, and in particular with regard to offset and range of the Wake-Up Signaling/Power Saving Signaling configurations.

SUMMARY

It is therefore an object of the present disclosure to provide a method performed by a WD, a WD, a method performed by a network node and a network node, a wireless device for communicating with a network node in a wireless communication network, which alleviate all or at least some of the above-discussed challenges.

It is also an object of at least some embodiments to provide mechanisms related to configuration of PSS Monitoring Occasions and capability signaling for PDDCH based PSS.

It is also an object of at least some embodiments to provide mechanisms for PSS offset configurations with and without UE assistance information (or UE capability signaling).

It is also an object of at least some embodiments to provide mechanisms for PSS MO range configurations with and without UE assistance information (or UE capability signaling).

It is also an object of at least some embodiments to provide mechanisms for UE behavior upon receiving a specific PSS MO configuration from the NW.

In accordance with an aspect of the present disclosure, there is provided a method performed by a wireless device (WD) for communicating with a network node in a wireless communication network. The method comprises configuring the WD with a Discontinuous Reception (DRX) configuration having an ON-duration configuration and a long/short DRX cycle configuration, the DRX configuration defining a timing and a length of an ON-duration for the WD based on a message from the network node. The method further comprises configuring the WD with a Power Saving Signal (PSS) configuration based on a message from the network node, wherein the PSS configuration comprises a PSS offset and a PSS range, and where the PSS offset and the PSS range define a starting point and length of a PSS Monitoring Window (MW) within which at least one PSS Monitoring Occasion (MO) occurs. Further, the method comprises monitoring a signal or channel at one or more PSS MOs within the PSS MW.

As mentioned, the term Power Saving Signal (PSS) may also be referred to as Wake-up Signal (WSU). The PSS may be a "PDCCH-based" PSS, and the step of monitoring may comprise monitoring the PDCCH at the one or more PSS MOs.

In accordance with some embodiments, the PSS range comprises a number of search space sets defining the length of the PSS MW. In other words, the PSS range may define a number of search space sets that define the length of the PSS MW. For example, up to ten search spaces may be configured for a UE/WD for PDCCH monitoring.

Moreover, in accordance with some embodiments, the PSS offset defines a time offset or a slot offset of the starting point of a PSS Monitoring Window (MW) with respect to the ON-duration, and the PSS range defines a time duration or a slot duration of the PSS MW within which the at least one PSS Monitoring Occasions (MOs) occurs. In some embodiments, the time duration is defined by a number of search space sets that are configured in a row, i.e. from the first search space (SS) to the last SS.

Further, in accordance with some embodiments the method further comprises upon detection of a PSS during the at least one PSS MO within the PSS MW, performing at least one action indicated in the PSS.

The action indicated in the PSS may be at least one of the following actions:
  Monitoring a Physical Downlink Control Channel (PDCCH) at one or more PDCCH monitoring occasions (MOs) in a subsequent/following ON-duration of the DRX cycle.
  Performing a bandwidth part (BWP) switch.
  Reporting Channel State Information (CSI).
  Performing a Secondary cell (Scell) adaptation.
  triggering a MAC entity to start a DRX ON-duration timer.

Further, in accordance with some embodiments, the method further comprises transmitting a signal to the network node, the signal being indicative of at least one of a WD type, a WD capability, and a WD processing time (e.g. of PDCCH), where the PSS configuration is further based on at least one of the WD type, the WD capability, and the WD processing time.

In accordance with another aspect of the present disclosure there is provided a wireless device for communicating with a network node in a wireless communication network, the wireless device comprising processing circuitry configured to execute the method performed by a wireless device according to any one of the embodiments disclosed herein. With this aspect of the disclosure, similar advantages and preferred features are present as in the previously discussed first aspect of the disclosure.

Still further, in accordance with another aspect of the present disclosure, there is provided a method performed by a network node for communicating with a WD in a wireless communication network. The method comprises determining a Discontinuous Reception (DRX) configuration having an ON-duration configuration and a long/short DRX cycle configuration, the DRX configuration defining a timing and length of an ON-duration for the WD. The method further comprises determining a Power Saving Signal (PSS) configuration, wherein the PSS configuration comprises a PSS offset and a PSS range, where the PSS offset and the PSS range define a starting point and length of a PSS Monitoring Window (MW) within which at least one PSS Monitoring Occasion (MO) occurs. Furthermore, the method comprises transmitting the DRX configuration and PSS configuration to the WD. With this aspect of the disclosure, similar advantages and preferred features are present as in the previously discussed first aspect of the disclosure.

Yet further, in accordance with another aspect of the present disclosure, there is provided a network node configured to communicate with a wireless device in a wireless communication network, the network node comprising processing circuitry configured to execute the method performed by a network node according to any one the embodiments herein.

At least some of the embodiments of the present disclosure may lead to advantages in terms facilitating (PDCCH-based) PSS MO configuration with or without UE capability signaling, which in turn leads to UE power savings with limited impact on NW performance.

Further embodiments of the disclosure are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present disclosure will in the following be further clarified with reference to the embodiments described hereinafter.

BRIEF DESCRIPTION OF THE DRAWINGS

Further objects, features and advantages of embodiments of the disclosure will appear from the following detailed description, reference being made to the accompanying drawings, in which:

FIGS. 13-16 are flowcharts illustrating methods implemented in a communication system including a host computer, a base station and a user equipment.

DETAILED DESCRIPTION

Figure 1:
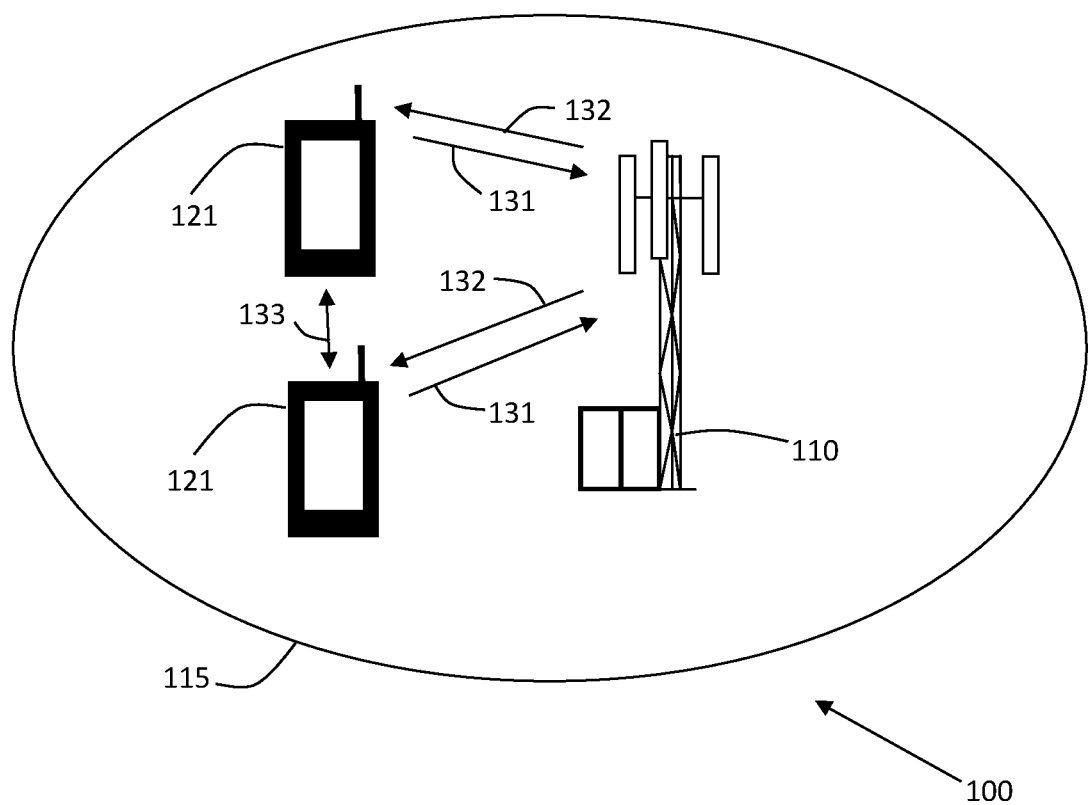
FIG. 1 is a schematic illustration of a network node and a wireless device in a wireless communications network.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate, and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

FIG. 1 depicts a wireless communications network 100 in which embodiments herein may operate. In some embodiments, the wireless communications network 100 may be a radio communications network, such as, 5G or NR network. Although, the wireless communications network 100 is exemplified herein as an 5G or NR network, the wireless communications network 100 may also employ technology of any one of LTE, LTE-Advanced, WCDMA, GSM/EDGE, WiMax, UMB, GSM, or any other similar network or system. The wireless communications network 100 may also employ technology of an Ultra Dense Network, UDN, which e.g. may transmit on millimetre-waves (mmW).

The wireless communications network 100 comprises a network node 110. The network node 110 may serve wireless devices in at least one cell 115, or coverage area. The network node 110 may correspond to any type of network node or radio network node capable of communicating with a wireless device and/or with another network node, such as, a base station (BS), a radio base station, gNB, eNB, eNodeB, a Home NodeB, a Home eNodeB, a femto Base Station (BS), or a pico BS in the wireless communications network 100. Further examples of the network node 110 may be a repeater, multi-standard radio (MSR) radio node such as MSR BS, network controller, radio network controller (RNC), base station controller (BSC), relay, donor node controlling relay, base transceiver station (BTS), access point (AP), transmission points, transmission nodes, a Remote Radio Unit (RRU), a Remote Radio Head (RRH), nodes in distributed antenna system (DAS), or core network node.

In FIG. 1, two wireless devices 121 are located within the cell 115. The wireless devices 121 are configured to communicate within the wireless communications network 100 via the network node 110 over a radio link served by the network node 110. Utilizing the radio link, a bi-directional communications flow may be set up between the wireless devices 121 and any entity capable of communication via the wireless communications network 100. The wireless devices 121 may transmit data over an air or radio interface to the radio base station 110 in uplink, UL, transmissions 131 and the radio base station may transmit data over an air or radio interface to the wireless devices 121 in downlink, DL, transmissions 132. The wireless devices 121 may refer to any type of wireless devices (WDs) or User Equipments (UEs) communicating with a network node and/or with another wireless device in a cellular, mobile or radio communication network or system.

As part of the developing of the embodiments described herein, it has been realized that there currently exist certain challenges in related to UE Power Saving mechanisms in 3GPP as will be elaborated upon in the following. In more detail, it is desired that a PDCCH-based Power Saving Signal (PSS) outside the active time is to be configured with an offset (herein referred to as WUS offset or PSS offset) before the ON duration of a C-DRX cycle and with a configured range (herein referred to as WUS range or PSS range).

The following description elaborates on the details of the underlying monitoring occasions (MO) configurations, particularly with regard to WUS/PSS offset and the WUS/PSS range as well as the criteria for choosing suitable offsets and ranges. As noted, the terms WUS and PSS, and by extension PSS configuration and PSS configuration, WUS offset and PSS offset (sometimes referred to as PS_offset), as well as WUS range and PSS range are used interchangeably herein.

Figure 2:
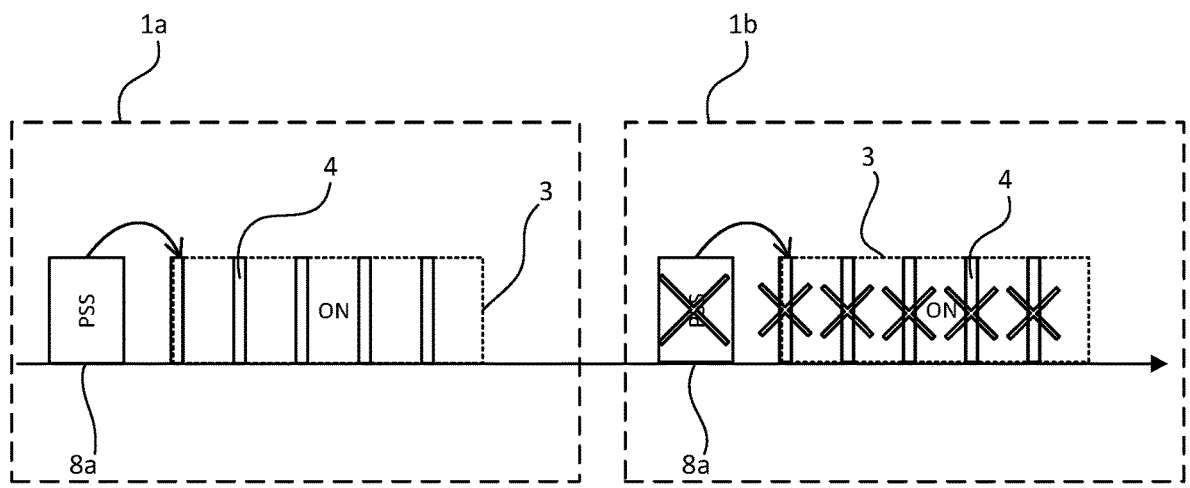
FIG. 2 is a schematic illustration of UE actions upon detection or non-detection of PSS in accordance with some embodiments.
Figure 3:
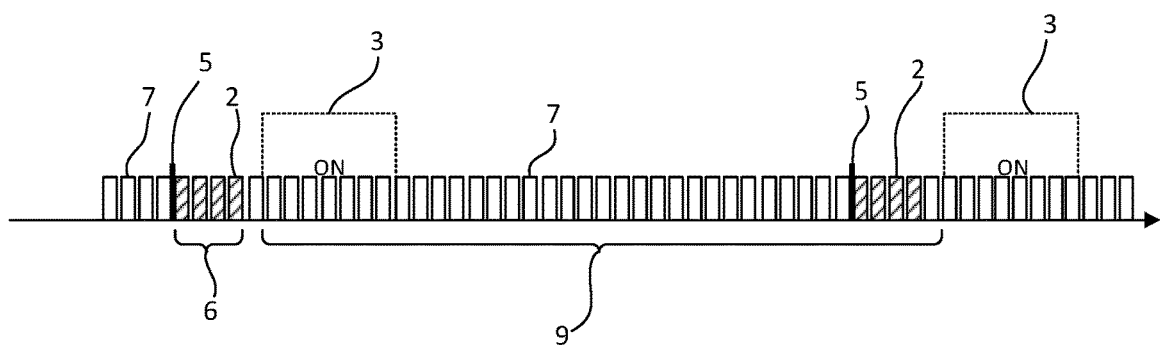
FIG. 3 is a schematic illustration of a PSS offset and PSS range configuration in accordance with some embodiments.

In reference to FIG. 2 and FIG. 3, an example scenario is where the UE is configured with a specific DRX configuration including at least an "ON duration" configuration 3, as well as a long and/or short DRX cycle 9 configuration. Furthermore, a UE may be configured with one or more PSS Monitoring Occasions (MOs) 2 that occur before an ON duration 3 in accordance with some embodiments. Thus, the PSS MOs 2 may be in a PSS monitoring window (MW) 7 that starts at some point before an ON duration 3 of the DRX cycle and ends at another point before the ON-duration 3 of the DRX cycle 9.

The PSS or WUS 8a may be based on a signal sent over PDCCH using an existing or a new Downlink Control Information (DCI) format. If a DCI based scheme is used, then one may reuse the coding chain specified in Rel-15, including the CRC payload interleaver. In Rel-15, DCI with smaller number of information bits was discussed and handled through the following principle, captured in 38.212, subclause 7.3.1. Thus, Rel-15 PDCCH channel coding and payload interleaver can already handle the case when the number of information bits in a DCI is less than 12 bits, by appending zeros until the payload size is 12. Subsequently, a 24-bit CRC is attached with a 16-bit RNTI masking. The UE could improve the detection performance by taking the additional information (regarding zero padding bits and additionally trading off the 24 bits of CRC for error correction, etc.) into the Polar SSCL decoding.

The UE decodes the DCI, and if the PSS 8a is intended for waking up that UE (specifically or as part of a group), the UE monitors PDCCH at PDCCH monitoring occasion (MOs) 4 during the next ON duration 3, as indicated in the broken line box 1a in FIG. 2. Note that these monitoring occasions (MOs) 4 associated with the ON duration of the DRX cycle differ from the WUS/PSS MOs 2. Alternatively or additionally, the UE follows NW configured/commanded actions upon detection of PSS 2 (e.g. generating an aperiodic CSI report, scheduling a PDSCH through PSS, etc.). Alternatively or additionally the UE may trigger the MAC entity to start the "DRX ON Duration Timer".

Otherwise, if UE does not detect PSS/WUS 8a (as indicated in the broken line box 1b in FIG. 2), the UE may skip monitoring PDCCH in the next occasion 3, or follow other types of NW configured/commanded operation upon non-detection of PSS/WUS 8a. For example, in some embodiments the UE may monitor PDCCH in a different search space (SS) than the regular one and with a longer periodicity.

In accordance with some embodiments, the PSS would be sent when UE is not in Active time (e.g. before On duration) to indicate wake up and monitor PDCCH in an On Duration.

In this case, since UE is not monitoring any scheduling DCI simultaneously, the BDs/CCEs/DCI budgets for power saving signals for PSS do not need to be shared with UE's scheduling DCI. Hence there is more flexibility in configuring these parameters (BD/CCEs/DCI) for the PSS.

Accordingly, the PDCCH-based PSS should indicate 'wake-up' or not based on which the UE can decide to decode/not decode subsequent PDCCH monitoring occasion(s). Furthermore, a bit field can be configured for indicating the transition from 'dormancy-like' to 'non-dormancy like' behaviour on activated Scells.

Further, apart from allowing link adaptation for PSS, it is also beneficial to reduce number of information bits in DCI as it can yield significant performance gains (~1 dB from 16 bits→1 bit). Thus, the design of PSS DCI should allow the use of very small number of information bits in the DCI addressed to a UE. As such the NW should be able to not configure some of the bitfields if it wishes so, particularly the bitfields related to L1 based mechanism to transit the UE from—dormancy-like behaviour to non-dormancy like behaviour.

Further, in reference to the DCI size/format for PDCCH-based PSS, since the PDCCH-based PSS may be expected to be always monitored separately from scheduling PDCCH monitoring, the new DCI format size can be independently configured. This allows using a more compact and robust DCI size and will not be affected by DCI format size budget that is applicable during Active time.

Moreover, if the WUS/PSS is used to address a group of UEs, e.g. for wake up. This can be done using approach like TPC-PUXCH-RNTI where PSS for multiple UEs is sent in one PDCCH with each UE assigned specific DCI bit(s) for its corresponding wake-up indication.

Like some of DCI formats 2-x, the number of information bits in new DCI format may in some embodiments, be configurable from the higher layers, and for indicating wake up or not, which would need only 0 or 1 bit of information. Additionally, in accordance with some embodiments, the NW can decide to configure or not an additional bit field with a specific bitwidth size to accommodate the L1 based mechanism to transit the UE from dormancy-like behavior to non-dormancy like one. The size of this bitfield corresponds to the number of Scell groups configured by the NW.

Moreover, since the WUS/PSS DCI can address a single UE or a group of UEs in a transparent manner, higher layers may be used to indicate to a UE where the relevant information for that UE is within the new DCI via a starting location (S) and length (L) values.

An optional length (L) can also be indicated, the lengths in the range of 1 to L bit can be supported, where L includes one bit for wake-up or not indication, and the other L-1 bits are related to Scell transition indication from dormancy to non-dormancy like behavior. In accordance with some embodiments, where Scell adaptation indication is to be included in the PSS DCI, the length can also be obtained from the number of Scell groups configured for PSS Scell transition indication, and as such the starting position configuration should suffice, and the UE can automatically deduce the length of the associated bitfield. L=0 implies a fixed DCI payload (e.g. DCI with information bits set to all zero). L=1 allows group DCI with wake-up indication for each UE signal i.e. explicit indication for each UE to wake-up or not. Note that, the NW can also assign the same bitfield to one or a group of UEs transparent to the UEs.

Since the DCI can be addressed to a single UE or a group of UEs, the search space used for PSS transmission may, in accordance with some embodiments, be configurable for additional flexibility.

In more detail, up to ten search spaces can be configured for a UE for PDCCH monitoring in active time in a BWP. An additional search space can be configured for the UE or one of the existing search spaces configured for PDCCH monitoring in Active time can be reused. It is already agreed that this should at least be a CSS. Configuring PSS in UESS can also bring benefits. Although, PS-RNTI is considered as a group-common RNTI, nevertheless, it can also be associated with a single UE, and PSS DCI fields can also be configured only for one UE, so one may argue that in this case to use CSS is a waste of common resources and may increase the PDCCH blocking probability. The blocking probability can particularly increase if the number of UEs assigned to each group is small, or that there are a number of groups with single UEs. As such, since a dedicated SS is going to be designed for PSS, it may also become independent from the generic SS design paradigm and allow using UESS for PSS monitoring particularly for the case where PS-RNTI is only associated with a single UE. In this case, the use of UESS seems more attractive than CSS and reduces the PDCCH blocking probability.

FIG. 3 shows an example of a PSS configuration with a PSS offset 5 and a PSS range 6. The PSS offset 5 and the PSS range 6 define a starting point 5 and length of a PSS Monitoring Window (MW) within which at least one PSS Monitoring Occasion (MO) 2 occurs. The PSS MOs 2 are represented by patterned bars while the non-PSS MO are represented by empty bars 7. Here, the PSS offset 5 is five slots and the PSS range 6 is four slots. Since the Search Space has a periodicity of one slot, the four slots after the PSS offset 5 are considered as PSS MOs 2.

In the following, some of the mechanisms to configure the PDCCH based PSS MO(s) 2 are disclosed in accordance with some embodiments. The same principles may be extended to other PDCCH based power saving signal outside the active time. In the following, some embodiments defining how the two parameters of PSS MOs 2, i.e. the PSS offset 5 and the PSS range 6 may be configured. The term "active time" is to be interpreted as during the ON duration of the DRX cycle. Thus, outside the active time may for example be a time period before the ON duration of the DRX.

In some embodiments, the one or more PSS MO(s) 2 may be configured using an explicit offset or a range of offsets. For example, the network node (e.g. gNB) may configure the UE via higher layers (e.g. RRC signaling) with an explicit offset in terms of a slot duration (e.g. X slot before ON duration of the DRX cycle), or a time duration (e.g. Y ms before the start of ON duration of the DRX cycle). Thus, the PSS offset 5 may be configured with respect to the starting time/point of the ON duration window 3 of the DRX. According to some embodiments, the PSS range 6 comprises a number of search space sets defining the length of the PSS MW.

The explicit offset itself may be used as an indication of in which slot the PSS MO(s) 2 is/are expected. Moreover, the exact PSS MO(s) 2 may be configured via the underlying PDCCH configuration including the SS and CORESET associations. As such, the MO(s) 2 may occur after the PSS offset value as configured via SS and Coresets association. Accordingly, the SSs that are configured before the offset may not need to be monitored by the UE. According to some embodiments, offset values may be part of the cell, BWP or SS configuration. For example, a number of SS (i.e., one or more) may be dedicated to power saving signal outside the active time, and then each dedicated SS is configured with an offset before the ON duration instead of SS periodicity.

Further, in accordance with some embodiments, the PSS configuration comprises a first PSS offset and/or a first PSS range for the short DRX cycle and a second PSS offset and/or a second PSS range for the long DRX cycle. Here, first PSS offset is different from the second PSS offset, and the first PSS range is different from the second PSS range. In other words, the network node (e.g. gNB) may configure different PSS offsets 5 or ranges of PSS offsets 5 for short and long DRX cycles 9. E.g., the network node may determine to configure the PSS MO(s) 2 three slots before the ON duration for long DRX and one slot before the ON duration for short DRX for one or more wireless devices. Alternatively, the network node may consider the range of slots to be shorter for short DRX than the range of slots for long DRX or vice versa. Even though the example is presented in terms of slots, the same principles are applicable for ranges of PSS Offsets define by a range in time (e.g. 2-5 ms or 4-6 ms).

Simulation results have shown that WUS/PSS provides power savings for both long and short DRX, with a small degradation of UPT. Thus, independent configurations of WUS/PSS for long and short DRX can be more beneficial as then it provides more flexibility in choosing the trade-offs.

Further, in reference to the range of value to consider for the WUS/PSS offset, it has been shown that that larger PSS offset leads to User Perceived Throughput (UPT) degradation and hence PSS offset should be as small as possible. This should be taken into account when considering the range of PSS offset. Thus, in accordance with some embodiments, the WUS/PSS offset is within a range of 1 slot to 10 ms (or equivalent at the slot level). This provides advantages in terms of limited UPT loss in the UE due to WUS/PSS and provides flexibility to the NW to transmit WUS/PSS.

In accordance with some embodiments, the network node or "Network" (NW) may configure an offset 5 that is sufficiently long for PSS PDCCH processing in the current receiver mode of the WD, or sufficiently long for a possible BWP change ahead of "onDuration monitoring" (i.e. for monitoring MO 4 within the On Duration 3 of the DRX cycle 9). However, the offset 5 need not necessarily be longer than required for those aspects, to avoid remaining in an non-deep sleep state during an unduly long time interval between the PSS 8a and the ON duration 3 of the DRX cycle 9. According to some embodiments, there is particularly a focus on the case where the NW configures a single PSS offset via higher layers. The same principles can be applied to other cases, such as e.g. configuring multiple PSS offsets for different cell groups or configuring a range of PSS offsets.

The PSS offset 5 may in some embodiments only be configured for monitoring PSS/WUS 8a in the P(S)cell. Nevertheless, if Secondary Cells (Scells) are configured for the UE, the NW or network node may determine/decide to assign a different PSS offset 5 for different Scell groups or for each Scell. Further, in some embodiments, the PSS/WUS offset 5 and/or the PSS/WUS duration 6 is/are only configured for a primary cell (Pcell) of the network node.

The NW may determine a minimum PSS offset (or PS_offset) 5 to configure for the UE based on a trade-off between power efficiency and UE throughput and potentially other factors. According to some embodiments, the NW can decide about the minimum PSS offset based on its past observation of the UE processing time or capability signaling. For example, the NW may have noted that the UE can process PDCCH within one slot, or within T ms, as such the NW may consider this as the minimum offset it can configure. The NW may decide about the minimum offset at per cell, per Bandwidth Part (BWP), per Subcarrier Spacing (SCS), or per SS basis. For example, the NW may consider a minimum offset of 1 slot if SCS of 15 KHz is used, but 2 to 4 slots if SCS of 60 kHz or 120 kHz is used and so on. UE capability signaling may be understood as the part of the initial access signaling from the UE/WD to let the network know its capabilities, this may also be referred to as a UE capability report. The UE may also update the signaled/reported capabilities.

Furthermore, the NW may take the potential additional commands associated with the Wake Up Signal (WUS) 8a or Power Saving Signal (PSS) 8a into account while determining the minimum offset. In more detail, if the PSS 8a comprises a BWP switching command, the NW can consider a larger minimum offset based on the type of BWP switch. Further, if the PSS 8a is intended to transit Scells from dormancy like to non-dormancy like behavior or vice-versa, the NW may decide to use a larger PSS offset 5 allowing the UE to prepare for such a transition. According to some embodiments where the UE is triggered with a CSI report using the PSS 8a, the UE may need to prepare its receiver for such a report, wherefore the NW can configure a larger minimum PSS offset.

Further, if the WUS or PSS configuration is intended for a group of UEs, the NW may further determine the minimum offset based on different criteria. According to some embodiments, the NW may determine a minimum offset for the UE(s) with the lowest observed processing time, or the largest minimum offset associated individually to the UEs. However, in accordance with some embodiments, the NW may determine the opposite and choose the minimum offset based on the smallest possible minimum offset, and so on.

After determining the minimum offset (note that determining a "minimum offset" is optional, and NW can arbitrarily decide about the PSS offset 5 directly), the NW decides about how to configure the actual PSS offset 5. The NW may decide to configure PSS offset 5 per cell, per BWP, or per SS. For example, the NW may configure different PSS offsets for different BWPs with different Subcarrier Spacing (SCS). For example, if SCS in one BWP is larger than another one, the NW may configure a larger PSS offset 5 in the former one, or vice versa. Alternatively, according to some embodiments, the NW may decide to configure the same PSS offset 5 for all the BWPs, or configure one per cell applicable to all the underlying BWPs if configured with PSS.

To choose the PSS offset 5 in each of the examples described above, the NW can either use the minimum offset that it has determined as the PSS offset 5, or add a margin to accommodate a higher level of flexibility. According to some embodiments, the NW may decide the margin such that the PSS MOs 2 is close to Synchronization Signal Block (SSB) measurements outside the active time. According to some embodiments, the NW may decide the margin based on range (slots or time) plus the minimum offset. According to some embodiments, and particularly when PSS is configured for multiple UEs, the NW may decide about the PSS offsets 5 to be aligned among the UEs, or different UEs are configured with a different PSS offset 5. In case PSS offsets 5 are to be aligned for all the UEs or subset of UEs, the NW can take different criteria into account for determining the PSS offset 5. According to some embodiments, the PSS offset is determined based on the slowest UE to process PSS, or the one with the largest individual offset. In another example the NW may decide based on opposite criterion, i.e., the PSS offset is decided based on the fastest UE(s) to process PSS, or based on average, and so on.

The NW may further consider the additional delay impact of the PSS offset 5. Long offsets move the effective scheduling decision point earlier and increase the delay for data arriving between the PSS 8a and onDuration 3 start by an additional cDRX cycle length 9. The NW may therefore limit the length of the PSS offset 5 to a minimum predetermined value based on the delay requirements of the current traffic type(s) to the UE or to a value that limits the ratio of the offset 5 and the cDRX period not to exceed a predetermined value, e.g. 5-10%.

Another parameter in configuring the PSS MOs 2 is the PSS range 6 after PSS offset 5 which may be understood as a PSS MO "window" (or PSS window). In other words, the UE monitors PSS 8a in the PSS MOs 2 configured within this range 6. The PSS range 6 may be defined in different ways, e.g. Y slots after the PSS offset 5, Z ms after the PSS offset 5, or by a number of search space sets that the UE should monitor for PSS MOs 2.

According to some embodiments, the range 6 can be configured with higher layer signaling per cell, per BWP, or per SS indicating the range 6 of possible PSS occasions 8a after the PSS offset 5. According to some embodiments, the range 6 may be part of the PDCCH based PSS configuration using Search Space (SS) Information Element (IE). For example, a new parameter called "PSS duration", or the like, may be added to SS IE determining the number of times the same SS is repeated in the next slots.

According to some embodiments, the range is not configured explicitly but implicitly through SS IE configuration. For Example, all the configured MOs outside the active time, from PSS offset 5 until the ON duration 3 can be considered as PSS MO(s) 2.

To determine the PSS range 6, according to some embodiments, the NW may decide based on the PDCCH blocking probability. In other words, in some embodiments, the PSS range 6 may be determined, by the network node, based on a PDCCH blocking probability. As such, the NW considers a range including multiple PSS MOs 2 to make sure the blocking probability remains below a specific threshold. According to some embodiments, and particularly when Wake-Up Signaling is configured for multiple UEs, the NW may decide the range for different UEs to be the same or different.

In accordance with some embodiments, the UE is configured to transmit UE assistance information indicating its preferred PSS range. The preferred PSS range may further be defined per cell, per BWP, per SCS, per SS, and so forth. For example, the UE may report its preferred PSS range per SCS as follows:

| SCS | Y slots after PSS Offset |
| --- | --- |
| 15 kHz | 4 |
| 30 kHz | 4 |
| 60 kHz | 6 |
| 120 kHz | 8 |

Furthermore, the UE may adjust its preferred PSS range if it has already the knowledge about the configured PSS offset 5. For example, if the configured PSS offset 5 is large enough, the listed values in the previous example may be used. However, if the PSS offset is not considered to be large enough the listed value may be reduced accordingly. The upper limit of the PSS offset may be 10 ms, or equivalent at the slot level for each numerology, i.e., 10 slots for 15 kHz, 20 slots for 30 kHz, 40 slots for 60 kHz, and 80 slots for 120 kHz. This is calculated based on $10 * 2^\mu$ where $\mu$ is the numerology number, e.g., 0 for 15 kHz, 1 for 30 kHz, and so on.

A potential issue is related to the situation where the UE is configured with additional Scells potentially with different numerology than the Pcell. Here, the UE processing time for PDCCH-PSS may be related to the numerology on the Pcell as the PSS/WUS is only sent on the Pcell. In case the Pcell numerology is smaller than the Scell, a smaller offset value may be considered as "a baseline PSS offset". Nevertheless, at the ms level, it still provides sufficient time for the UE to wake-up and monitor PDCCH on all the cells. The same argument holds for the opposite situation, i.e., when the SCS on Pcell is larger than Scell, with the difference that in this case a larger "baseline offset" can be considered which is still large enough for all the cells to wake-up and monitor PDCCH.

The NW may then configure the UE with a PSS/WUS range 6 as suggested by the UE or not. Furthermore, in case the PSS/WUS configuration intended for multiple UEs, the NW may decide to configure the PSS range 6 individually for each UEs, or aligned for all the UEs or one or more subsets of them. In case of the latter, the NW may further to decide to determine the PSS range 6 based on the suggested narrowest, widest, average PSS range 6, and so on.

Analogously, the NW or network node may further take UE assistance information into account while configuring the PSS/WUS configuration, and in particular the PSS/WUS offset 5. UE assistance can be provided via one or more of the MAC CE based, RRC based or UE capability signaling.

From a network point of view, it may be useful if all UEs supporting Wake-Up Signaling can do so with similar PSS processing time. Having such a baseline capability could allow efficient NW configuration and usage of Wake-Up Signaling including group-based wake-up indication in the Downlink Control Information (DCI). Therefore, for UEs supporting Wake-Up Signaling, a baseline capability (i.e. mandatory) for minimum PSS processing could be defined.

The baseline processing time requirement for UE supporting PSS may be as follows with dependency on SCS for the PDCCH-based WUS/PSS in accordance with some embodiments. These example values may be applicable for a simple "wakeup or not" functionality.

| SCS | X symbols (in numerology of the PDCCH-PSS, end of PDCCH to beginning of first symbol of ON duration |
|---|---|
| 15 kHz | 39 |
| 30 kHz | 39 |
| 60 kHz | 53 |
| 120 kHz | 53 |

In some embodiments, the PSS/WUS 8a indicates one or more actions ("advanced commands" in the following). Accordingly, if the PSS/WUS 8a is indicative of one or more advanced commands, a separate corresponding baseline minimum processing time requirement may also be defined. For example, if BWP switching, or CSI report/trigger, are included in the PSS/WUS 8a, then the corresponding actions for a given cell may be applied at the same time for that cell. In more detail, if BWP switching is indicated by the PSS/WUS 8a and a Wake-Up is indicated using PSS/WUS, since BWP switching would be ongoing, the Wake-Up action (e.g. PDCCH monitoring in the next ON Duration 3) would apply after BWP switching is completed. For other cells for which there is no BWP switching, the regular Wake-Up timeline may be applied.

Further, in accordance with some embodiments, the UE assistance information is a higher layer signaling indicating the minimum processing time of the UE to process the PSS/WUS 8a. For example, the UE may determine the minimum processing time (purely) based on the time it needs to process PDCCH and/or get ready to "wake up" and monitor PSS 8a at the PSS MO(s) 2, and/or consider additional criteria such as the optimal configuration to provide power savings. Furthermore, the UE assistance information in this aspect may be based on or depend upon the specific SCS, BWP, cell, and so on. Below, some processing time requirements for different SCS are listed in accordance with some embodiments.

| SCS | M symbols (in numerology of the PDCCH-PSS, end of PDCCH to beginning of first symbol of ON duration |
|---|---|
| 15 kHz | 25 |
| 30 kHz | 25 |
| 60 kHz | 53 |
| 120 kHz | 53 |

Further, the UE may take into account if additional Secondary Cells (Scells) are configured and/or additional commands are included in the PSS payload, such as, e.g. Scell activation or deactivation with Scells having mixed numerologies, and accordingly adjust the minimum processing time.

Moreover, in accordance with some embodiments, the UE may indicate additionally via a second (advanced/fast) PSS/WUS processing time indication that it also has a "fast processing capability", in other words, that the UE is capable of processing PSS/WUS "faster". This may be numerology-specific signaling i.e. UE may support the second (advanced/fast) processing time only for a subset of numerologies. Below, some second (advanced/fast) processing times for different SCS are listed in accordance with some embodiments.

| SCS | N symbols (in numerology of the PDCCH-PSS, end of PDCCH to beginning of first symbol of ON duration |
|---|---|
| 15 kHz | 11 |
| 30 kHz | 11 |
| 60 kHz | 11 |
| 120 kHz | 11 |

Thus, the NW or network node may take the "minimum processing time" of the UE into account while deciding the PSS offset and monitoring occasion configuration. Accordingly, in some embodiments, the NW or network node may decide/determine to consider the minimum processing time as the minimum offset, or simply decide that the minimum processing time should be considered as the PSS/WUS offset 5. The procedures to configure the PSS offset may follow in accordance with any of the embodiments provided herein.

In reference to the "UE assistance information", in accordance with some embodiments, the UE may indicate its preferred PSS offset to the NW. Then, the NW may decide to configure or not the PSS offset 5 as suggested by the UE. In case a group of UEs is to be addressed by Wake-Up Signaling, the NW may decide to determine the PSS offset 5 to be aligned for all the UEs or set them individually or aligned for a subset of UEs. In case PSS offset 5 is to be aligned for all the UEs within the same PSS configuration or a subset of them, the NW may further apply different criteria in choosing the PSS offset 5. For example, the NW may decide to choose the longest preferred PSS offset, or the shortest, or an average or any other suitable criteria.

Figure 4:
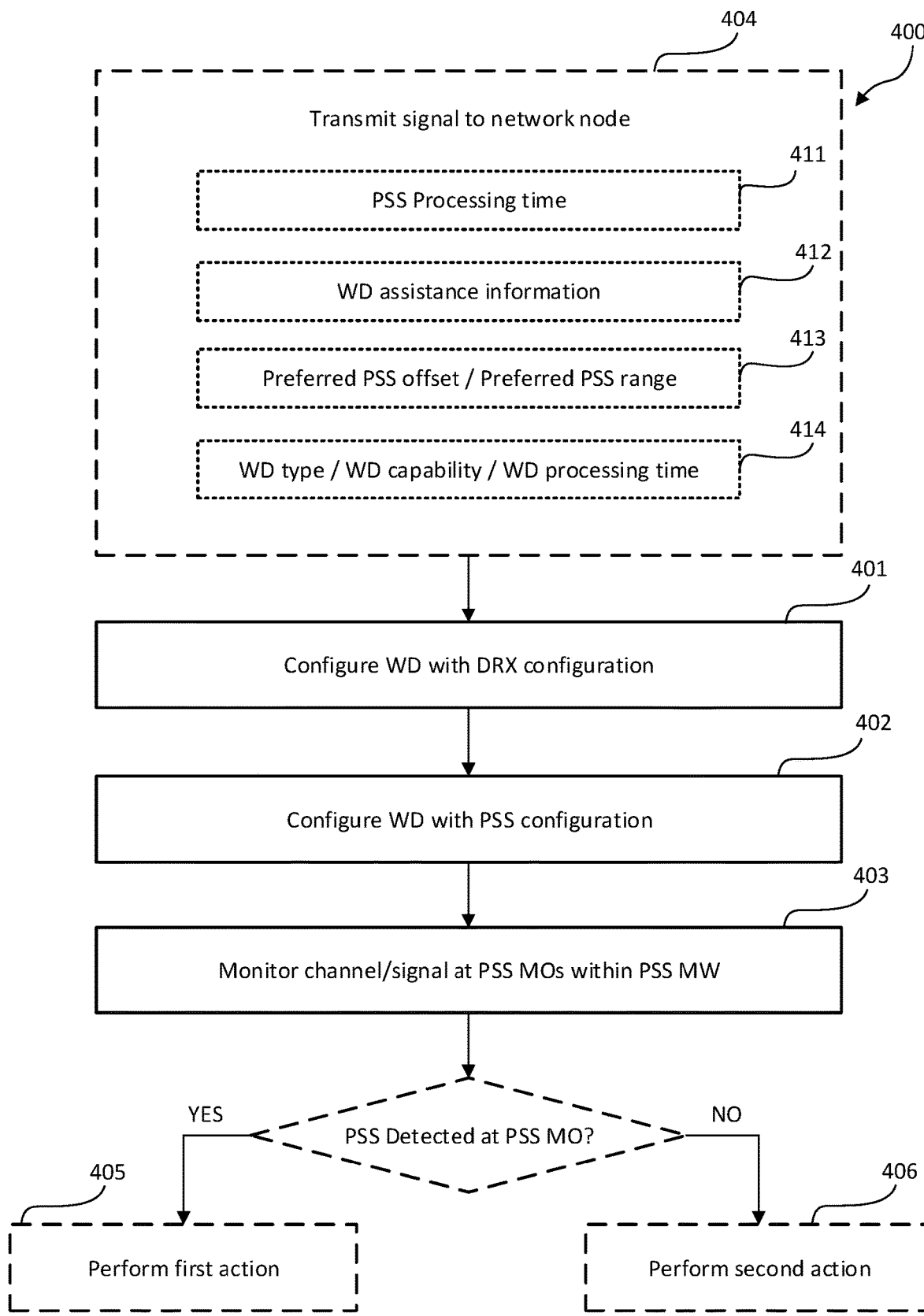
FIG. 4 is a schematic flow chart representation of a method performed by a wireless device for communication with a network node in a wireless communication network in accordance with some embodiments.

FIG. 4 is a schematic flow chart representation of a method 400 performed by a WD for communicating with a network node in a wireless communication network in accordance with an embodiment of the present disclosure. The method 400 comprises configuring 401 the WD with a Discontinuous Reception (DRX) configuration, where the DRX configuration has an ON-duration configuration and a long/short DRX cycle configuration. The DRX configuration defines a timing and a length of an ON-duration for the WD based on a message from the network node. In this context, the DRX configuration may be obtained via RRC signaling from the network node. Thus, the method 400 may further comprise a step of receiving one or more messages from the network node.

The method 400 further comprises configuring 402 the WD with a Power Saving Signal (PSS) configuration based on a message from the network node, wherein the PSS configuration comprises a PSS offset and a PSS range, and where the PSS offset and the PSS range define a starting point and length of a PSS Monitoring Window (MW) within which at least one PSS Monitoring Occasion (MO) occurs. Analogously as before, the WD may be configured 402 via RRC signaling from the network node. Further, the method 400 comprises monitoring 403 a signal or a channel at one or more PSS MOs within the PSS MW. The PSS may be a PDCCH-based PSS, and the step of monitoring 403 may comprise monitoring the PDCCH at the one or more PSS MOs. In some embodiments, the PSS configuration comprises a SS association and a Control Resource Set, CORESET, association for the PSS Monitoring Occasion(s).

When the WD/UE is configured 402 with WUS/PSS MOs based on a combination of SS, WUS/PSS offset and WUS/PSS range as described in some of the embodiments herein, it is expected that UE monitors 403 PSS in the configured 402 MOs, and in case the UE received PSS in each of the PSS MOs with wake-up indication, it may be configured to monitor PDCCH in the next ON duration of the DRX cycle.

In case the WUS/PSS indicates the UE to wake-up or not in any of the PSS MOs, the UE can then skip the remaining MOs and follow the NW indication. Furthermore, in case the PSS MOs collides with another event, such as e.g., when the WUS/PSS MO falls within the active time, then the UE can follow the specified or configured activity. For example, if the UE has to wake up if one or more WUS/PSS MOs falls within the active time, then the UE does not need to monitor WUS/PSS MOs and can directly wake-up at the ON duration.

However, in some embodiments, if no WUS/PSS MO is available before an ON duration of a DRX cycle, the UE has to wake up and monitor PDCCH on that DRX cycle, unless it is configured otherwise by the NW or network node, or allowed by the standardization specification and so on. In an illustrative example, the DRX cycle is 160 ms and SS periodicity is equivalent of 320 ms, then every other DRX cycle does not have a valid WUS/PSS MO and as such the UE has to wake up and monitor PDCCH in that DRX cycle.

According to some embodiments, the UE is configured to wake up at the WUS/PSS offset and get ready to monitor 403 WUS/PSS MO(s). According to some embodiments, and particularly when the first WUS/PSS MO falls after WUS/PSS offset, the UE may be configured to delay the wake-up till the first WUS/PSS MO. Furthermore, the UE may be configured to select an appropriate power saving mode between the WUS/PSS MOs depending on their time distance to each other.

In some embodiments, the UE may be configured to implement an appropriate power saving mode after the end of WUS/PSS range until the ON duration of the DRX cycle based on an indication from the WUS/PSS. If the available time is short (e.g. one or two slots), the UE may be configured to adopt a power saving mode that allows the UE to go back to normal PDCCH monitoring rapidly, such as by e.g. turning off the RF antennas, and so forth. However, if the time is longer (e.g. a few ms), then the UE may be configured to adopt a more stringent power saving mode and turn off additional modules.

Further, in accordance with some embodiments, the UE may further take WUS/PSS statistics and/or historical data into account. In particular in relation to the monitoring 403 of the WUS/PSS MOs. For example, the UE may be configured to note that the NW sends the WUS/PSS to the UE in a specific WUS/PSS MOs or after a specific one, or between one and another WUS/PSS MOs all or most of the times.

Accordingly, the UE may be configured to skip monitoring 403 WUS/PSS in the other WUS/PSS MOs which are not included in the previous condition. In other words, the UE may be configured to skip monitoring 403 WUS/PSS in the WUS/PSS MOs that are determined to be less likely to be used by the NW or network module for transmitting the WUS/PSS. Nevertheless, in this case the UE may need to make sure specific conditions, such as minimum detection performance, and so on are satisfied. The UE may infrequently tentatively monitor 403 WUS/PSS MOs that could be skipped according to the above logic to continuously ascertain that no WUS/PSS transmissions take place there.

The PSS range may comprise a number of search space sets defining the length of the PSS MW. Moreover, in some embodiments the PSS offset defines a time offset or a slot offset of the starting point of a PSS Monitoring Window (MW) with respect to the ON-duration, and the PSS range defines a time duration or a slot duration of the PSS MW within which the at least one PSS Monitoring Occasions (MO) occurs. The PSS offset (may also be referred to as WSU offset) may be a single value (e.g. 5 slots, 15 ms) or a range of values (e.g. 5-10 slots, 15-30 ms). Analogously, the PSS range (may also be referred to as WSU range or WSU MO range) may be a single value (e.g. 4 slots, 8 ms) or a range of values (3-7 slots, 6-14 ms).

Further, in accordance with some embodiments the method further comprises, upon detection of a PSS during the at least one PSS MO within the PSS MW, performing 405 at least one first action indicated in the PSS.

The first action indicated in the PSS may comprise at least one of the following actions:

Monitoring a Physical Downlink Control Channel (PDCCH) at one or more PDCCH monitoring occasions (MOs) in a subsequent/following ON-duration of the DRX cycle.
Performing a bandwidth part (BWP) switch.
Reporting Channel State Information (CSI).
Performing a Secondary cell (Scell) adaptation.

triggering a MAC entity to start a DRX ON-duration timer.

In reference to the above discussion of the UEs power saving measures or implementations of power saving modes, the UE may be configured to adapt its power saving measures described above based on the fact if the WUS/PSS includes additional commands/actions or not, such as the ones listed above. For example, if the WUS/PSS in addition to wake-up, also triggers a BWP switch, the UE may need to stay awake longer between the WUS/PSS and ON duration of the DRX cycle to perform the BWP switch.

Further, in accordance with some embodiments, the method 400 further comprises transmitting 404 a signal to the network node. The signal may be indicative of at least one of the following:

A WUS/PSS processing time 411 of the wireless device/UE.
WD/UE assistance information 412.
Preferred WUS/PSS offset 413 of the WD/UE.
Preferred WUS/PSS range 413 of the WD/UE.
A WD/UE type, a WD/UE capability, and/or a WD/UE processing time 414.

Accordingly, the WUS/PSS configuration (i.e. at least one of the PSS offset and the PSS range) may be based on one or more of the above signaled WD/UE parameters. These parameters may be signaled by the WD/UE to the network node in one or more Radio Resource Control (RRC) messages. In some embodiments at least one of the PSS offset and the PSS duration is defined based on a time duration or slot duration between the PSS MW and the ON-duration being of a length dependent on one or more WD capabilities. In more detail, the time duration or slot duration between the PSS MW and the ON-duration may in some embodiments be of a sufficient length to allow for the WD to perform a BWP change, or of a sufficient length to allow for Wake Up Signal (WUS) PDCCH processing in a current receiver mode of the WD. In other words, the WD capability may be a required time or slot duration to perform a BWP change, or a required time or slot duration for PSS PDCCH processing in a current receiver mode of the WD. The UE processing time comprise information about the UE's PDCCH processing time and/or the UE's WUS/PSS processing time.

Furthermore, in some embodiments, the method 400 further comprises, upon non-detection of the PSS/WUS during the at least one PSS/WUS MO within the PSS/WUS MW, performing 406 at least one of the following second actions:

Setting 406 the WD to a sleep-mode according to the DRX configuration.
Monitoring 406 PDCCH in a different search space (SS) as compared to the monitoring after the detection of the PSS.
Monitoring 406 PDCCH in the different SS as compared to the monitoring after the detection of the PSS and for a longer periodicity as compared to the monitoring after the detection of the PSS.

In accordance with some embodiments, the WUS/PSS configuration further comprises at least one of a periodicity and a timing of the PSS MO(s) within the PSS MW. Moreover, the WUS/PSS Offset may be specific for a specific UE/WD. Analogously, the WUS/PSS range may be specific fora specific UE/WD.

Figure 5:
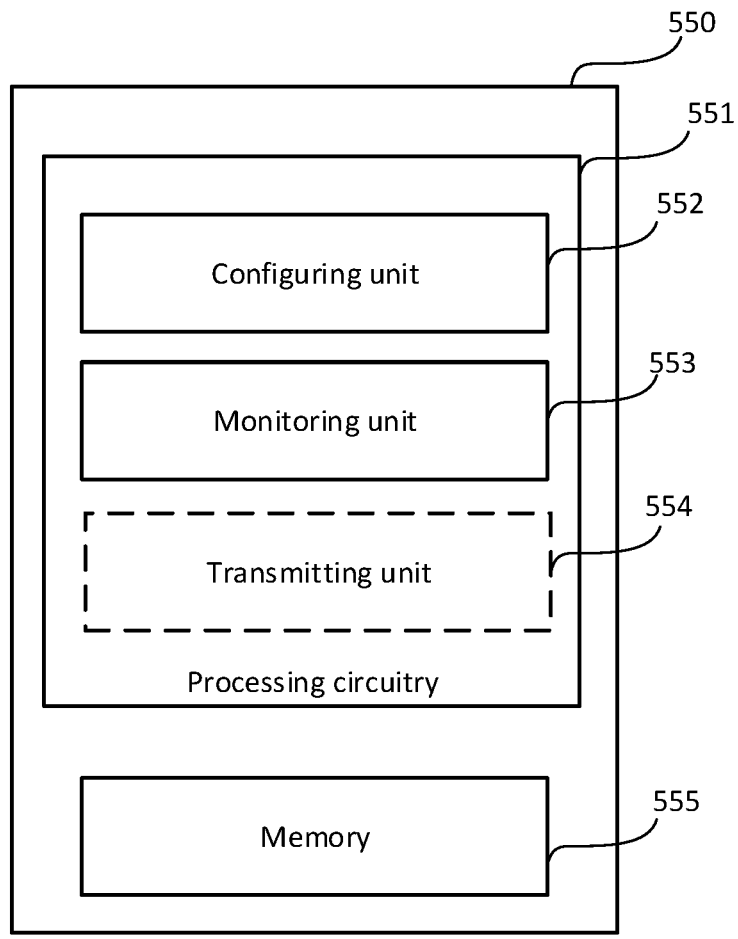
FIG. 5 is a schematic block diagram representation of a wireless device for communication with a network node in a wireless communication network in accordance with some embodiments.

FIG. 5 is a schematic block diagram representation of embodiments of an apparatus 550 in a wireless communication network 100 (for example, the wireless network shown in FIG. 1). The apparatus 550 may be implemented in a wireless device (e.g. the wireless device 121 shown in FIG. 1). The apparatus is operable to carry out the example methods described with reference to FIG. 4, and possibly any other processes or methods disclosed herein. It is also to be understood that the method of FIG. 4 is not necessarily carried out solely by apparatus 550. At least some operations of the method can be performed by one or more other entities. At least some operations of the method could be performed by one or more other entities.

Apparatus 550, also referred to as a virtual apparatus implemented in a wireless device (WD) or user equipment (UE), may comprise processing circuitry 551, which may include one or more microprocessor or microcontrollers, as well as other digital hardware, which may include digital signal processors (DSPs), special-purpose digital logic, and the like. The processing circuitry 551 may be configured to execute program code stored in memory 555, which may include one or several types of memory 555 such as read-only memory (ROM), random-access memory, cache memory, flash memory devices, optical storage devices, etc. Program code stored in memory 555 includes program instructions for executing one or more telecommunications and/or data communications protocols as well as instructions for carrying out one or more of the techniques described herein, in several embodiments. In some implementations, the processing circuitry 551 may be used to cause a control unit 552, a monitoring unit 553, a transmitting unit 554, and any other suitable units of apparatus 550 to perform corresponding functions according one or more embodiments of the present disclosure.

The wireless device 550 or processing circuitry 551 therein is configured to, or may comprise a configuring unit 552 configured to, configure the WD with a Discontinuous Reception (DRX) configuration having an ON-duration configuration and a long/short DRX cycle configuration. The DRX configuration defines a timing and a length of an ON-duration for the WD based on a message from the network node. The wireless device 550 or processing circuitry 551 therein is further configured to, or the configuring unit 552 is further configured to, configure the WD with a PSS configuration based on a message from the network node. The PSS configuration comprises a PSS offset and a PSS range, and the PSS offset and the PSS range define a starting point and length of a PSS Monitoring Window (MW) within which at least one PSS Monitoring Occasion (MO) occurs. Also, the wireless device 650 or processing circuitry therein is configured to, or may comprise a monitoring unit 553 configured to, monitor a signal or channel at one or more PSS MOs within the PSS MW.

Figure 6:
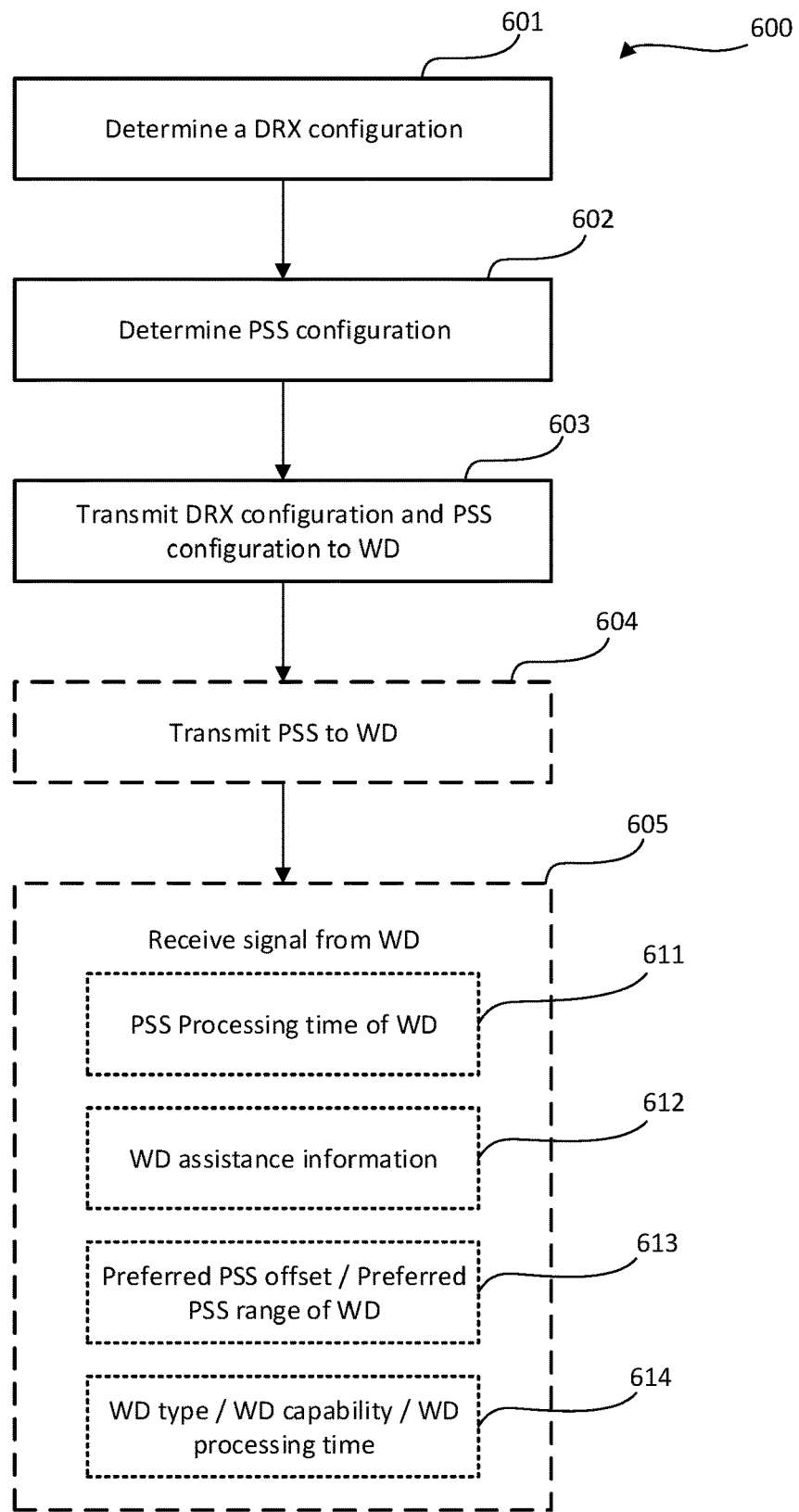
FIG. 6 is a schematic flow chart representation of a method performed by a network node for handling communication of wireless devices in a wireless communication network in accordance with some embodiments.

Moving on, example embodiments of a method 600 performed by a network node for handling communication of wireless devices in a wireless communication network will now be described with reference to the schematic flowchart illustrated in FIG. 6. Accordingly, FIG. 6 is an illustrated example of actions or operations, which may be taken or performed by the network node 110 in the wireless communication network 100 as described and shown in FIG. 1. The method 600 comprises determining 601 a Discontinuous Reception (DRX) configuration having an ON-duration configuration and a long/short DRX cycle configuration. The DRX configuration defines a timing and length of an ON-duration for the WD.

The method 600 further comprises determining 602 a WUS/PSS configuration, wherein the WUS/PSS configuration comprises a WUS/PSS offset and a WUS/PSS range, where the WUS/PSS offset and the WUS/PSS range define a starting point and length of a WUS/PSS Monitoring Window (MW) within which at least one PSS Monitoring Occasion (MO) occurs. Furthermore, the method comprises transmitting 603 the DRX configuration and PSS configuration to the WD.

As the skilled reader readily understands features, embodiments and advantages as have been discussed in the foregoing from the UE/WD perspective are analogously applicable for the network node point of view. Thus, for reasons of clarity and conciseness and to avoid unduly repetition, they will not be elaborated upon in explicit detail. By way of example, the WUS/PSS range comprised by the determined 602 WUS/PSS configuration may comprise a number of search space sets defining the length of the WUS/PSS MW. In some embodiments, the determined 602 PSS configuration further comprises at least one of a periodicity and a timing of the PSS MO(s) within the PSS MW.

Further, the method 600 may further comprise transmitting 604 the power saving signal (PSS) or wake-up signal (WUS) to the WD in accordance with the PSS configuration. In other words, the PSS may be transmitted 600 so to be received at the one or more PSS MOs by the WD. The PSS may be a PDCCH-based PSS, and the PSS configuration may comprise an indication of an instruction to monitor the PDCCH at the one or more PSS MOs.

In accordance with some embodiments, the transmitted 604 PSS may further comprise an indication of at least one of:
An instruction to monitor a Physical Downlink Control Channel (PDCCH) at one or more PDCCH monitoring occasions (MOs) in a subsequent/following ON-duration of the DRX cycle.
An instruction to trigger a MAC entity to start a DRX ON-duration timer.
An instruction to perform a bandwidth part (BWP) switch.
An instruction to report Channel State Information (CSI).
An instruction to perform a Secondary cell (Scell) adaptation.

Still further, the method 600 may further comprise receiving one or more signals (e.g. RRC messages) from the WD. The signal(s) may be indicative of at least one of the following:
A WUS/PSS processing time 611 of the wireless device/UE.
WD/UE assistance information 612.
Preferred WUS/PSS offset 613 of the WD/UE.
Preferred WUS/PSS range 613 of the WD/UE.
A WD/UE type, a WD/UE capability, and/or a WD/UE processing time 614.

Accordingly, the WUS/PSS configuration (i.e. at least one of the PSS offset and the PSS range) may be based on one or more of the above signaled WD/UE parameters. These parameters may be signaled by the WD/UE to the network node in one or more Radio Resource Control (RRC) messages. Moreover, the WUS/PSS Offset may be specific for a specific UE/WD. Analogously, the WUS/PSS range may be specific for a specific UE/WD.

Figure 7:
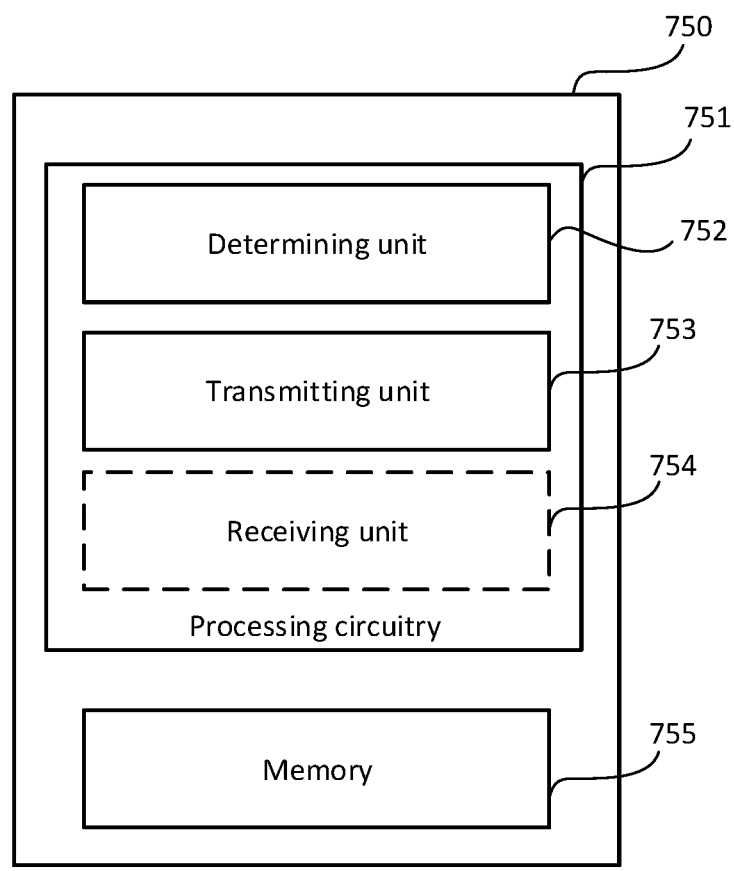
FIG. 7 is a schematic block diagram representation of a network node for handling communication of wireless devices in a wireless communication network in accordance with some embodiments.

FIG. 7 is a schematic block diagram representation of embodiments of an apparatus 750 in a wireless communication network 100. The apparatus 750 may be implemented in a base station or network node (e.g. the network node 110 shown in FIG. 1). The apparatus is operable to carry out the example methods described with reference to FIG. 6, and possibly any other processes or methods disclosed herein. It is also to be understood that the method of FIG. 7 is not necessarily carried out solely by apparatus 750. At least some operations of the method can be performed by one or more other entities. At least some operations of the method could be performed by one or more other entities.

Apparatus 750, also referred to as a virtual apparatus implemented in a base station, may comprise processing circuitry 751, which may include one or more microprocessor or microcontrollers, as well as other digital hardware, which may include digital signal processors (DSPs), special-purpose digital logic, and the like. The processing circuitry 751 may be configured to execute program code stored in memory 755, which may include one or several types of memory 755 such as read-only memory (ROM), random-access memory, cache memory, flash memory devices, optical storage devices, etc. Program code stored in memory 755 includes program instructions for executing one or more telecommunications and/or data communications protocols as well as instructions for carrying out one or more of the techniques described herein, in several embodiments. In some implementations, the processing circuitry may be used to cause a determining unit 752, transmitting unit 753, receiving unit 754, and any other suitable units of apparatus 750 to perform corresponding functions according one or more embodiments of the present disclosure.

The network node or processing circuitry 751 therein may be configured to, or may comprise the determining unit 752 configured to, determine a Discontinuous Reception (DRX) configuration having an ON-duration configuration and a long/short DRX cycle configuration. The DRX configuration defines a timing and length of an ON-duration for the WD. The network node or processing circuitry 751 therein may be configured to, or may comprise the determining unit 752 configured to, determine a WUS/PSS configuration. The WUS/PSS configuration comprises a WUS/PSS offset and a WUS/PSS range, where the WUS/PSS offset and the WUS/PSS range define a starting point and length of a WUS/PSS Monitoring Window (MW) within which at least one PSS Monitoring Occasion (MO) occurs. The network node or processing circuitry 751 therein may be further configured to, or may comprise the transmitting unit 753 configured to, transmit the DRX configuration and PSS configuration to the WD. In some embodiments, the network node or processing circuitry 751 therein may be configured to, or may comprise the receiving unit 754 configured to, receive one or more signals (e.g. RRC messages) from the WD as elaborated upon the foregoing.

Figure 8:
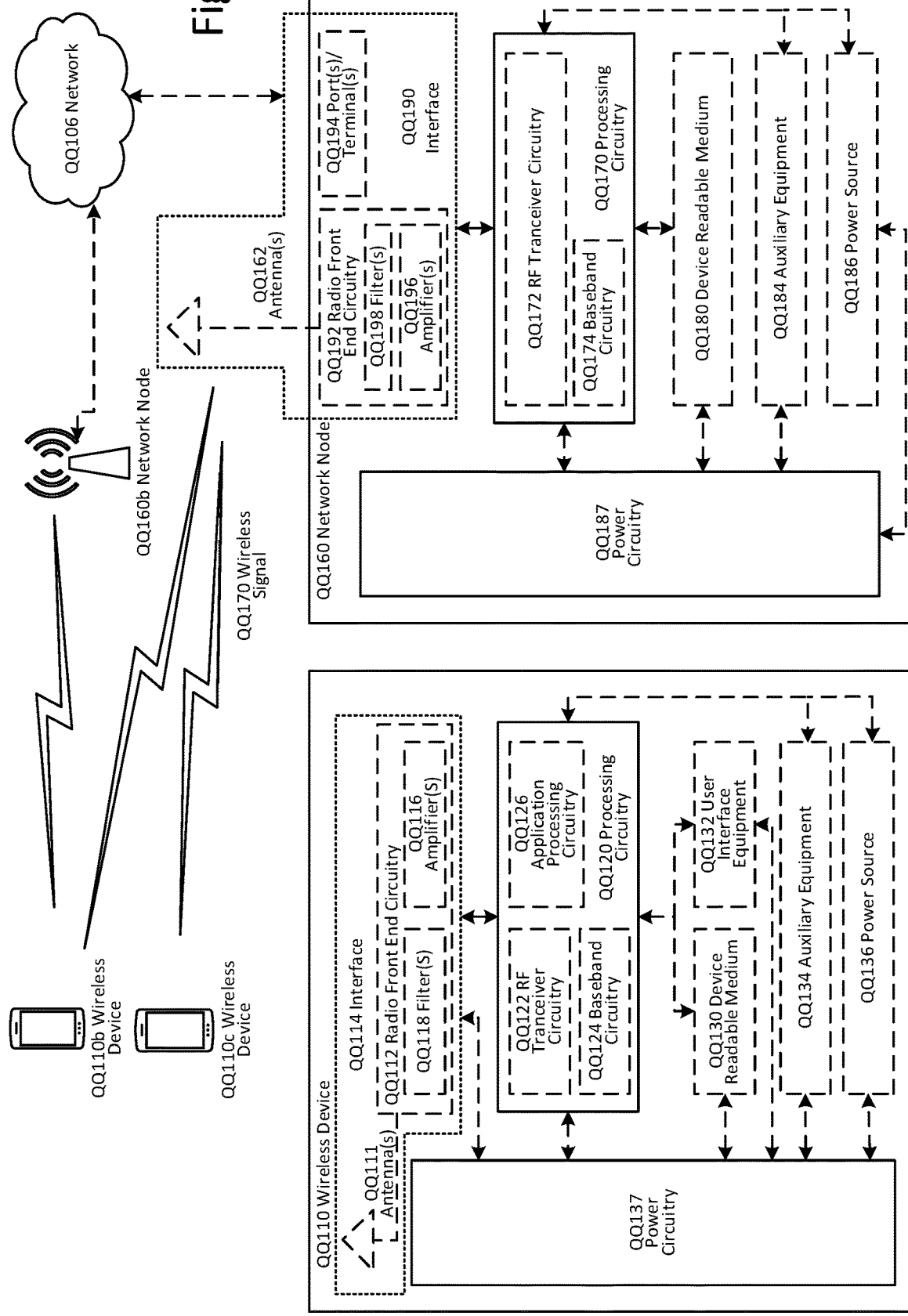
FIG. 8 is a schematic illustration of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 8 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 9:
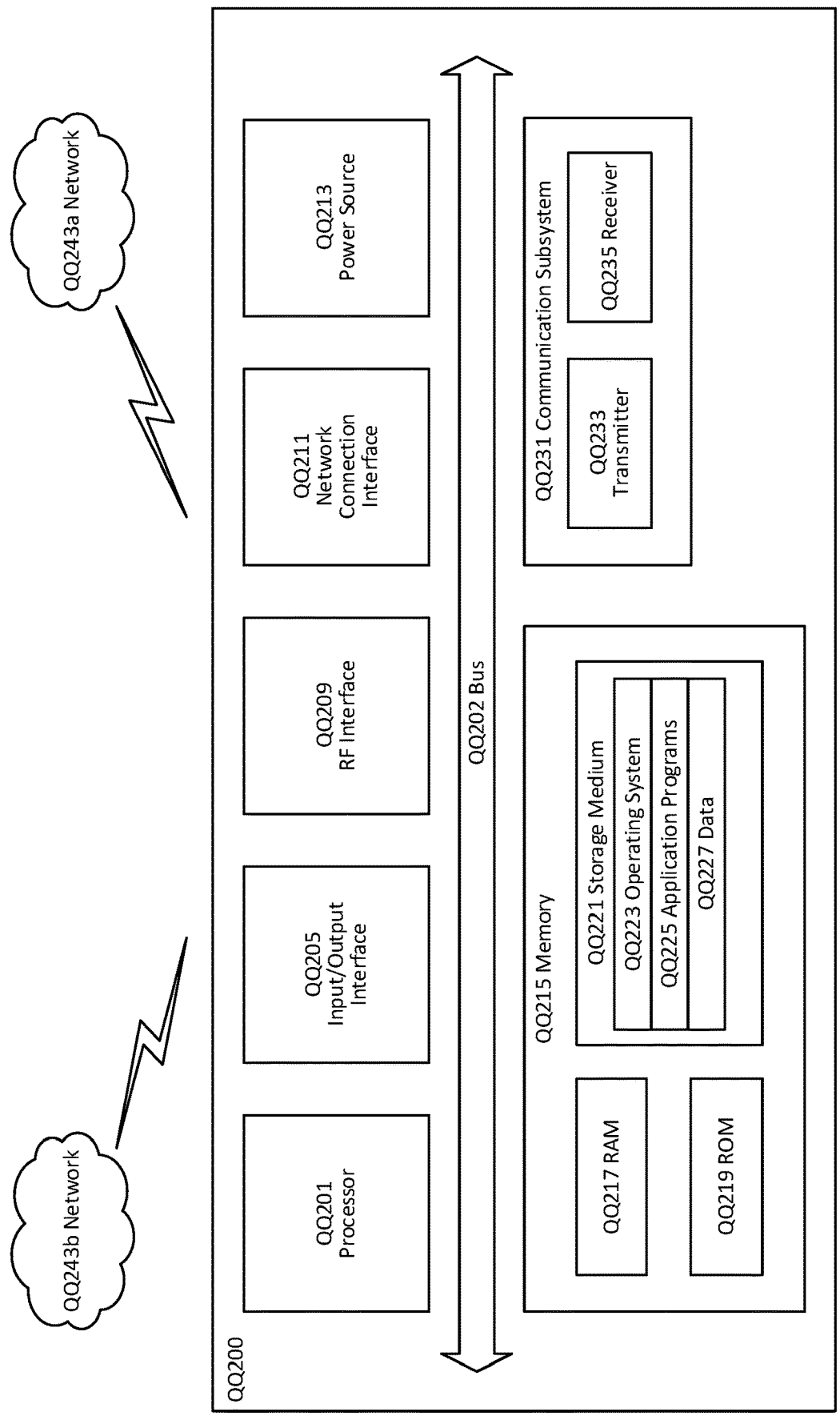
FIG. 9 is a schematic illustration of a user equipment.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 9, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 9, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein.

Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 10:
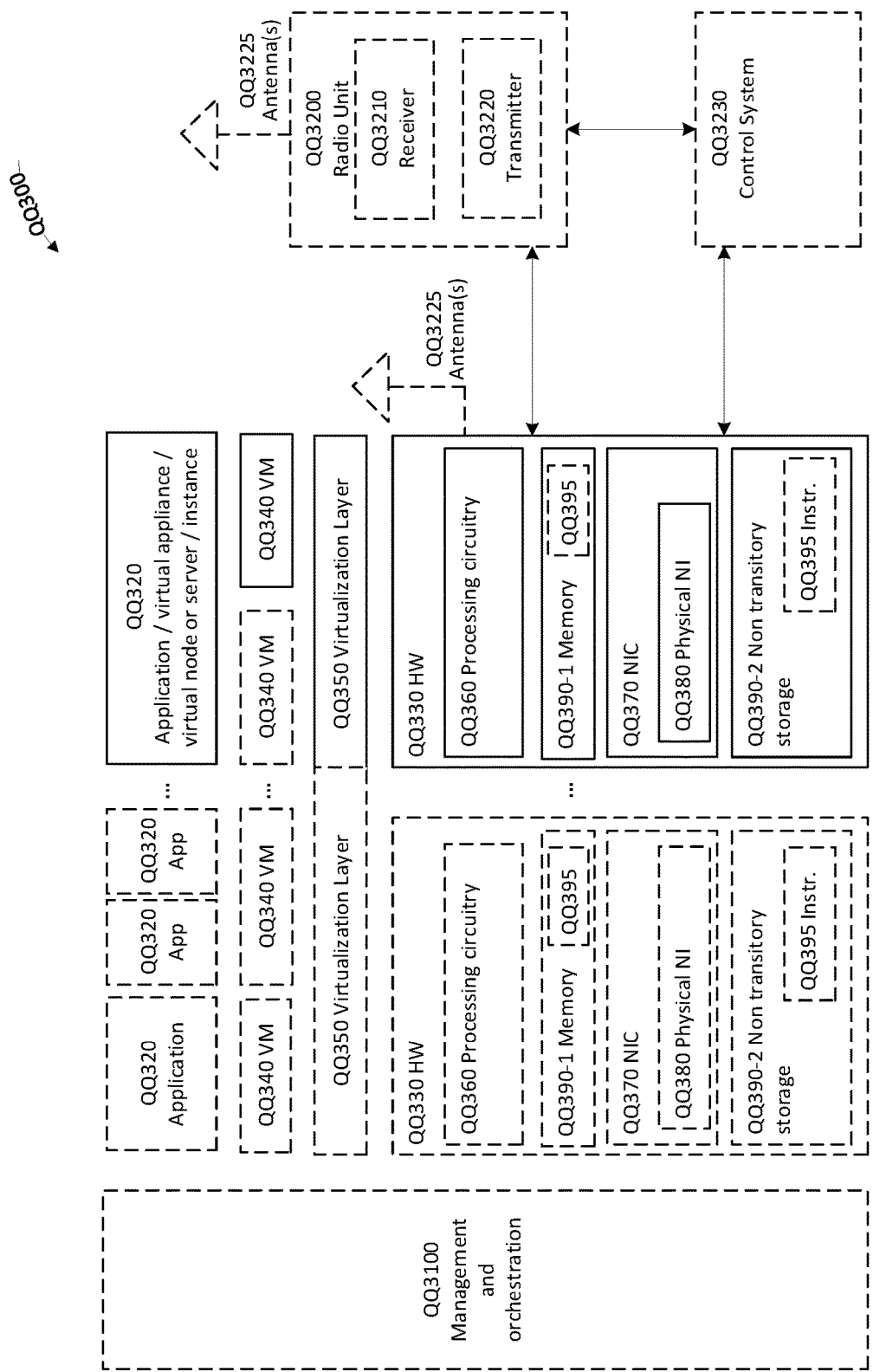
FIG. 10 is a schematic illustration of a virtualization environment in accordance with some embodiments.

FIG. 10 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 10, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in Figure QQ3. In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station. In some embodiments, some signalling can be effected with the use of control system QQ3230 which may alternatively be used for communication between the hardware nodes QQ330 and radio units QQ3200.

Figure 11:
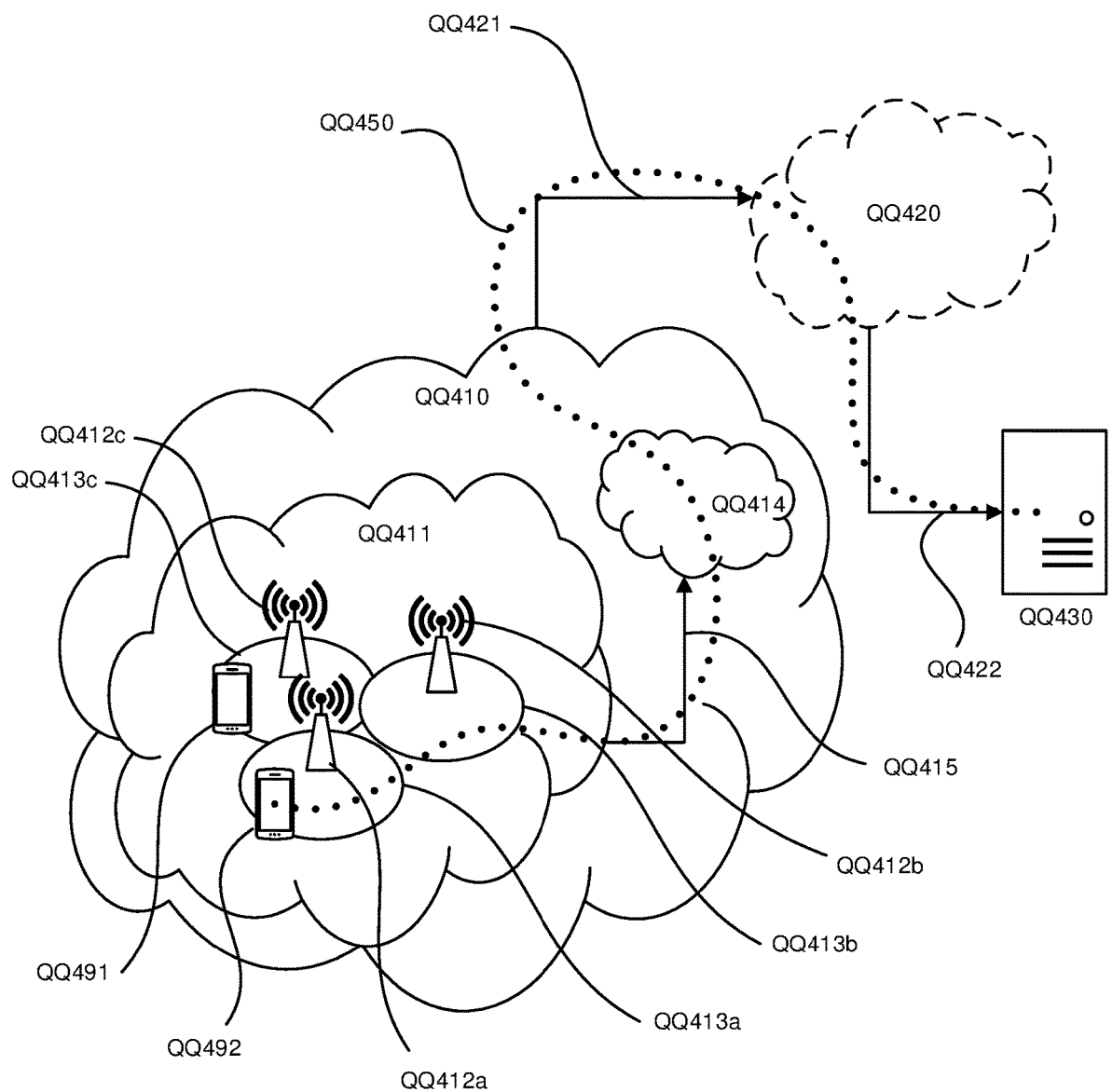
FIG. 11 schematically illustrates a telecommunication network connected via an intermediate network to a host computer.

With reference to FIG. 11, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 11 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 12. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 12) served by base station QQ520. Communication interface QQ526 may be configured to facilitate connection QQ560 to host computer QQ510. Connection QQ560 may be direct or it may pass through a core network (not shown in FIG. 12) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 12:
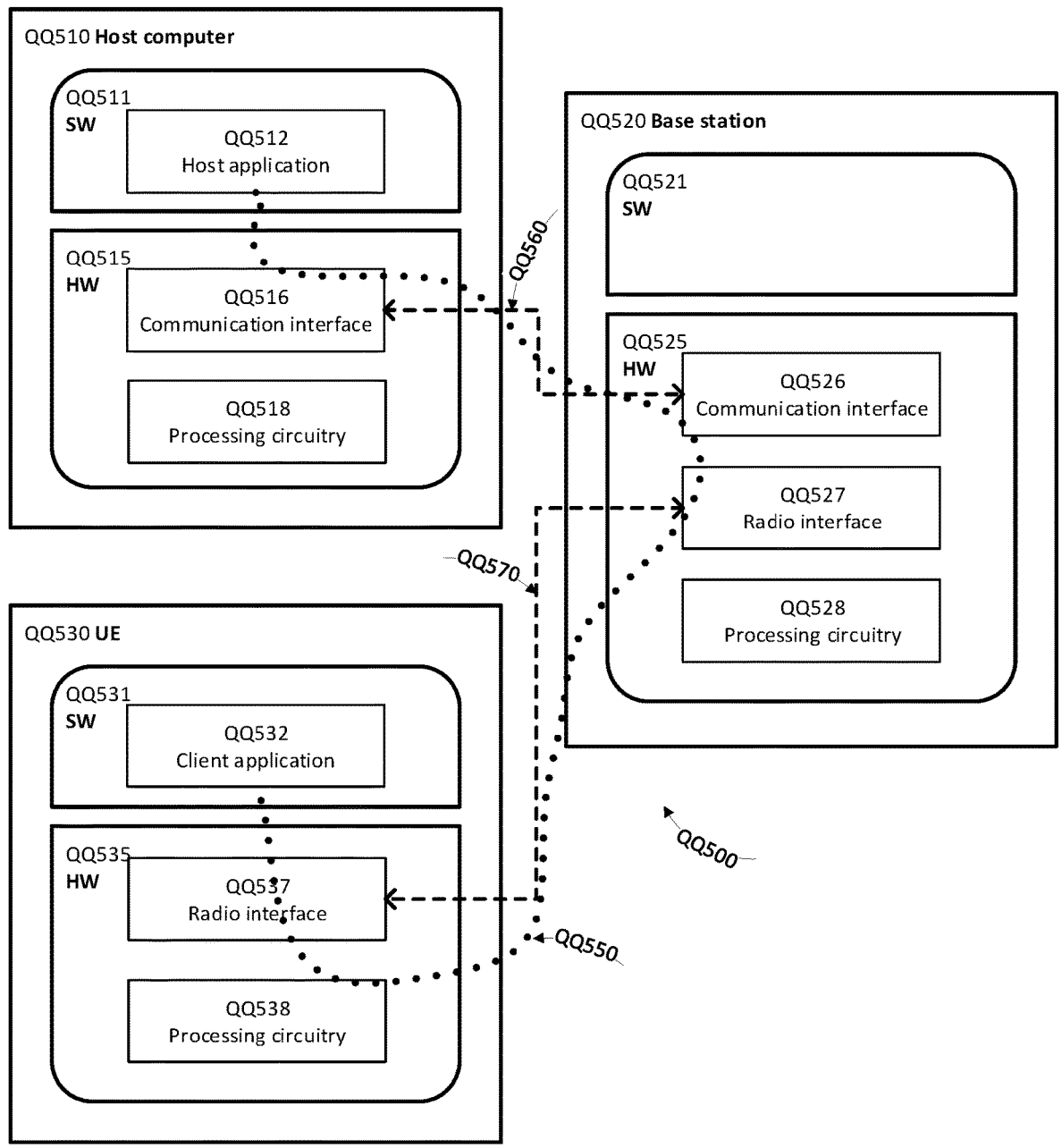
FIG. 12 is a generalized block diagram of a host computer communicating via a base station with a user equipment over a partially wireless connection.

It is noted that host computer QQ510, base station QQ520 and UE QQ530 illustrated in FIG. 12 may be similar or identical to host computer QQ430, one of base stations QQ412a, QQ412b, QQ412c and one of UEs QQ491, QQ492 of FIG. 11, respectively. This is to say, the inner workings of these entities may be as shown in FIG. 12 and independently, the surrounding network topology may be that of FIG. 11.

In FIG. 12, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the data rate and latency and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities.

The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

FIG. 13 is a flowchart illustrating a method implemented in a communication system, in accordance with one embodiment. The communication system includes a host computer, a base station and a UE which may be those described with reference to FIGS. 11 and 10. For simplicity of the present disclosure, only drawing references to FIG. 13 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 14 is a flowchart illustrating a method implemented in a communication system, in accordance with one embodiment. The communication system includes a host computer, a base station and a UE which may be those described with reference to FIGS. 11 and 10. For simplicity of the present disclosure, only drawing references to FIG. 14 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figures 15, 16:
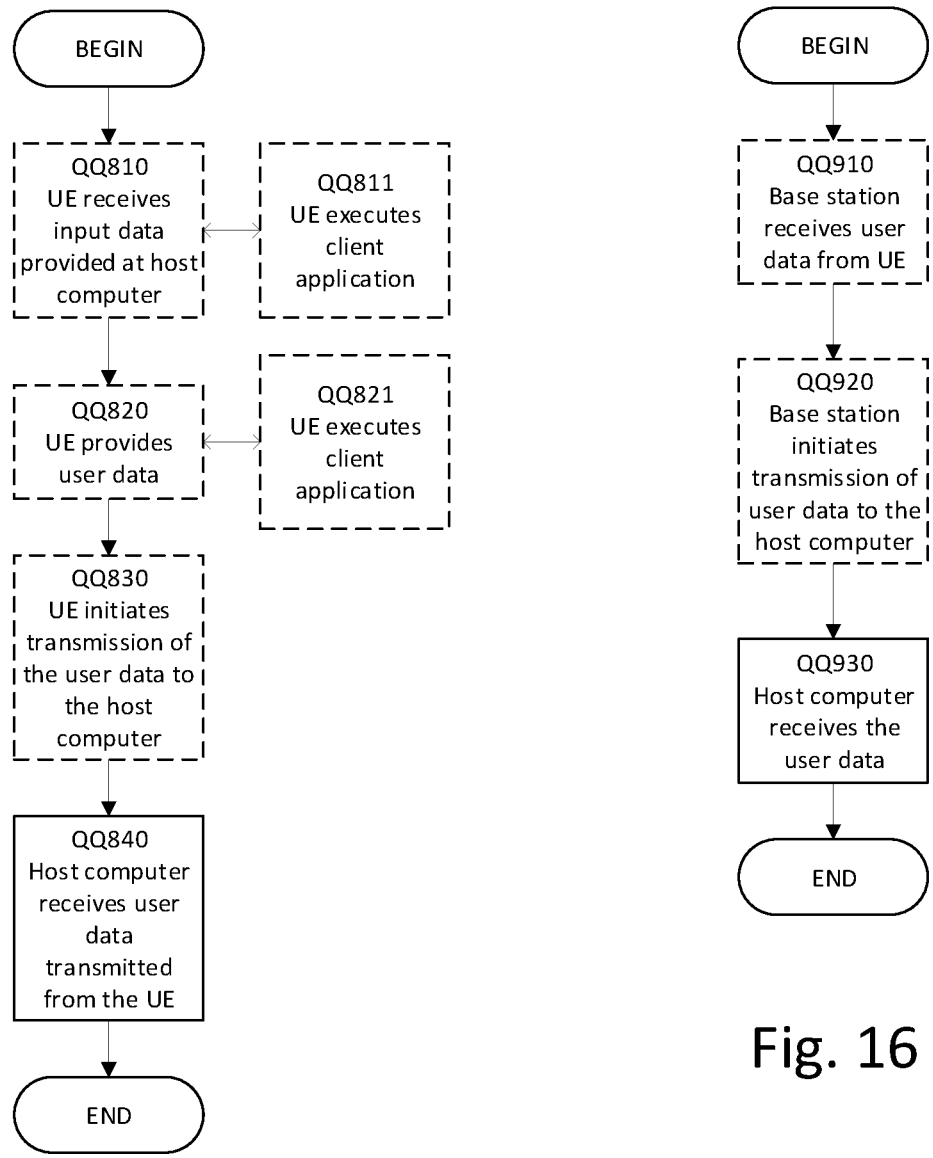

FIG. 15 is a flowchart illustrating a method implemented in a communication system, in accordance with one embodiment. The communication system includes a host computer, a base station and a UE which may be those described with reference to FIGS. 11 and 10. For simplicity of the present disclosure, only drawing references to FIG. 15 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station and a UE which may be those described with reference to FIGS. 11 and 10. For simplicity of the present disclosure, only drawing references to FIG. 16 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Some Examples

A1. A method performed by a wireless device (WD) for communicating with a network node in a communication network, the method comprising:

configuring the WD with a Discontinuous Reception (DRX) configuration having an ON-duration configuration and/or a long/short DRX cycle configuration defining a timing and length of an ON-duration for the WD based on a message from the network node;

configuring the WD with a Power Saving Signal (PSS) configuration based on a message from the network node;

wherein the PSS configuration comprises a PSS offset and/or a PSS range;

wherein the PSS offset and the PSS range define a starting point and length of a PSS Monitoring Window (MW) within which at least one PSS Monitoring Occasion (MO) occurs;

monitoring a signal/channel at one or more PSS MOs within the PSS MW.

A2. The method of example A1, wherein the PSS offset defines at least one dedicated SS that is dedicated for the PSS, and wherein each dedicated SS is configured with an SS-offset with respect to the ON-duration.

A3. The method of any one of examples A1 or A2, wherein the PSS configuration comprises a first PSS offset and/or a first PSS range for the short DRX cycle and a second PSS offset and/or a second PSS range for the long DRX cycle.

A4. The method of any one of examples A1-A3, wherein the PSS configuration is based on a power efficiency of the WD and/or WD throughput.

A5. The method of any one of examples A1-A4, wherein different PSS offsets and/or PSS ranges is/are configured for different secondary cell (Scell) groups or for different secondary cells (Scells).

A6. The method of any one of examples A1-A5, wherein the PSS offset is a minimum PSS offset.

A7. The method of any one of examples A1-A6, wherein the PSS offset and/or PSS range is/are based on at least one of a Bandwidth Part (BWP) parameter, a cell parameter, a Scheduling Candidate Set (SCS) parameter, and a Search Space (SS) parameter.

A8. The method of any one of examples A1-A7, wherein the PSS offset is based on one or more instructions indicated by the PSS.

A9. The method of any one of examples A1-A8, wherein the PSS offset is based on past/historical processing time or capability signaling of the wireless device.

A10. The method of any one of examples A1-A9, wherein the PSS offset is based on past/historical processing time or capability signaling of a plurality of wireless devices in communicative connection with the network node.

A11. The method of any one of examples A1-A10, wherein the PSS offset is based on a largest/longest of a plurality of minimum offsets, each minimum associated with one wireless device of a plurality of wireless devices in communicative connection with the network node.

A12. The method of any one of examples A1-A11, wherein the PSS offset is based on a smallest/shortest of a plurality of minimum offsets, each minimum associated with one wireless device of a plurality of wireless devices in communicative connection with the network node.

A13. The method of any one of examples A1-A12, wherein the PSS configuration is specific for a cell served by the network node, a BWP, an SS.

A14. The method of any one of examples A1-A13, wherein the PSS offset comprises a minimum PSS offset and a predefined margin.

A15. The method of any one of examples A1-A14, wherein the PSS offset is based on an average PSS offset of a plurality of PSS offsets, each PSS associated with one wireless device of a plurality of wireless devices in communicative connection with the network node.

A16. The method of any one of examples A1-A15, wherein the PSS offset is based on a performance of a plurality of wireless devices in communicative connection with the network node.

A17. The method of any one of examples A1-A16, wherein the PSS offset is based on a delay requirement of one or more current traffic types to the wireless device.

A18. The method of any one of examples A1-A17, wherein the PSS offset is based on a ratio of the PSS offset and a cDRX period in relation to a predetermined value.

A19. The method of any one of examples A1-A18, wherein the PSS offset and/or PSS range is/are based on a plurality of preferred PSS offsets and/or a plurality of preferred PSS ranges, each preferred PSS offset and/or each preferred PSS range being associated with one wireless device of a plurality of wireless devices in communicative connection with the network node.

A20. The method of any one of examples A1-A19, wherein the PSS range is based on a PDCCH blocking probability.

A21. The method of any one of examples A1-A20, further comprising:
upon detection of a PSS in the PSS MO within the PSS MW, ignoring/skipping any subsequent PSS MO(s) within the PSS MW.

A22. The method of any one of examples A1-A21, further comprising:
selecting a power saving mode (from a plurality of power saving modes) for the WD to occur between the PSS MOs within the PSS MW based on a spacing/time distance between the PSS MOs within the PSS MW.

A23. The method of any one of examples A1-A22, further comprising:
monitoring a specific PSS MO within the PSS MW based on previously monitored PSS MOs in previous PSS MWs.

A24. The method of any one of examples A1-A23, further comprising:
providing user data; and
forwarding the user data to a host computer via the transmission to the base station.

B1. A method performed by a base station for communicating with a wireless device (WD) in a communication network, the method comprising:
configuring/defining/determining/forming a Discontinuous Reception (DRX) configuration having an ON-duration configuration and/or a long/short DRX cycle configuration defining a timing and length of an ON-duration for the WD and a Power Saving Signal (PSS) configuration;
wherein the PSS configuration comprises a PSS offset and/or a PSS range;
wherein the PSS offset and the PSS range define a starting point and length of a PSS Monitoring Window (MW) within which at least one PSS Monitoring Occasion (MO) occurs;
transmitting the DRX configuration and PSS configuration to the WD.

B2. The method according to example B1, wherein the PSS offset defines at least one dedicated SS that is dedicated for the PSS, and wherein each dedicated SS is configured with an SS-offset with respect to the ON-duration.

B3. The method according to any one of examples B1-B2, wherein the PSS configuration comprises a first PSS offset and/or a first PSS range for the short DRX cycle and a second PSS offset and/or a second PSS range for the long DRX cycle.

B4. The method according to any one of examples B1-B3, wherein the PSS configuration is based on a power efficiency of the WD and/or WD throughput.

B5. The method according to any one of examples B1-B4, wherein the PSS configuration comprises an instruction for the WD so to upon detection of a PSS in the PSS MO within the PSS MW, ignore/skip any subsequent PSS MO(s) within the PSS MW.

B6. The method according to any one of examples B1-B5, wherein the PSS configuration comprises an instruction for the WD so to upon detection of a PSS in the PSS MO within the PSS MW, ignore/skip any subsequent PSS MO(s) within the PSS MW.

B7. The method according to any one of examples B1-B6, further comprising:
obtaining user data; and
forwarding the user data to a host computer or a wireless device.

C1. A wireless device for communicating with a network node in a wireless communication network, the wireless device comprising:
processing circuitry configured to perform any of the steps of any one of examples A1-A24; and
power supply circuitry configured to supply power to the wireless device.

C2. A base station for communicating with a wireless device in a wireless communication network, the base station comprising:
processing circuitry configured to perform any of the steps of any one of examples B1-B7; and
power supply circuitry configured to supply power to the wireless device.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

| Abbreviation | Explanation |
| --- | --- |
| 3GPP | 3rd Generation Partnership Project |
| BCCH | Broadcast Control Channel |
| BCH | Broadcast Channel |
| CDRX | Connected mode DRX (i.e. DRX in RRC_CONNECTED state) |
| CORESET | Control Resource Set |
| CRS | Cell-specific Reference Signal |
| CSI | Channel State Information |
| CSI-RS | Channel State Information Reference Signal |
| DCI | Downlink Control Information |
| DCCH | Dedicated Control Channel |
| DL | Downlink |
| DMRS | Demodulation Reference Signal |
| DRX | Discontinuous Reception |
| eNB | Evolved Node B |
| gNB | A radio base station in 5G/NR |
| IoT | Internet of Things |
| LTE | Long-Term Evolution |
| LTE-M | Long-Term Evolution for Machine-Type Communications |
| LTE-MTC | Long-Term Evolution for Machine-Type Communications |
| MBSFN | Multicast Service Single Frequency Network |
| NB-IoT | Narrowband Internet of Things |
| NR | New Radio |
| NRS | Narrowband Reference Signal |
| NSSS | Narrowband Secondary Synchronization Signal |
| NW | Network |
| OFDM | Orthogonal Frequency Division Multiplexing |
| PBCH | Physical Broadcast Channel |
| PCell | Primary Cell |
| PDCCH | Physical Downlink Control Channel |
| PDSCH | Physical Downlink Shared Channel |
| PRB | Physical Resource Block |
| PSS | Power Saving Signaling/Power Saving Signal |
| PUCCH | Physical Uplink Control Channel |
| PUSCH | Physical Uplink Shared Channel |
| RNC | Radio Network Controller |
| RRC | Radio Resource Control |
| SCell | Secondary Cell |
| SCS | Subcarrier Spacing |
| SSB | Synchronization Signal Block |
| SSS | Secondary Synchronization Signal |
| TDD | Time Division Duplex |
| TRS | Tracking Reference Signal |
| UE | User Equipment |
| UL | Uplink |
| WD | Wireless Device |
| WUS | Wake-Up Signaling/Wake-Up Signal |

The invention claimed is:

1. A method performed by a wireless device (WD) for communicating with a network node in a wireless communication network, the method comprising:
    configuring the WD with a Discontinuous Reception (DRX) configuration having an ON-duration configuration and a long/short DRX cycle configuration, the DRX configuration defining a timing and a length of an ON-duration for the WD based on a message from the network node;
    configuring the WD with a Power Saving Signal (PSS) configuration based on a message from the network node, wherein the PSS configuration comprises a PSS offset and a PSS range, and the PSS offset and the PSS range define a starting point and length of a PSS Monitoring Window (MW) within which at least one PSS Monitoring Occasion (MO) occurs; and
    monitoring a signal or channel at one or more PSS MOs within the PSS MW.

2. The method of claim 1, wherein the PSS range comprises a number of search space sets defining the length of the PSS MW.

3. The method of claim 1, wherein
the PSS offset defines a time offset or a slot offset of the starting point of a PSS MW with respect to the ON-duration, and
the PSS range defines a time duration or a slot duration of the PSS MW within which the at least one PSS MO occurs.

4. The method of claim 1, further comprising:
upon detection of a PSS during the at least one PSS MO within the PSS MW, performing at least one action indicated in the PSS.

5. The method of claim 4, wherein the action indicated in the PSS is at least one of the following actions:
monitoring a Physical Downlink Control Channel, PDCCH, at one or more PDCCH MOs in a subsequent ON-duration of the DRX cycle;
performing a bandwidth part, BWP, switch;
reporting Channel State Information, CSI;
performing a Secondary cell, Scell, adaptation;
triggering a MAC entity to start a DRX ON-duration timer.

6. The method of claim 1, wherein the PSS is a PDCCH-based PSS, and the step of monitoring comprises monitoring the PDCCH at the one or more PSS MOs.

7. The method of claim 1, wherein the PSS MW ends at a point before the ON-duration.

8. The method of claim 1, further comprising:
transmitting a signal to the network node indicative of a PSS processing time of the wireless device,
wherein the PSS configuration is based on the PSS processing time of the wireless device.

9. The method of claim 1, further comprising:
transmitting a signal to the network node, the signal comprising WD assistance information;
wherein at least one of the PSS offset and the PSS range is based on the WD assistance information.

10. The method of claim 1, further comprising:
transmitting a signal to the network node, the signal comprising at least one of a preferred PSS offset and a preferred PSS range of the WD,
wherein the PSS offset is based on the preferred PSS offset of the WD and/or the PSS range is based on the preferred PSS range of the WD.

11. The method of claim 1, further comprising:
upon non-detection of the PSS during the at least one PSS MO within the PSS MW, performing at least one of the following actions:
setting the WD to a sleep-mode according to the DRX configuration; and
monitoring PDCCH in a different search space, SS, as compared to the monitoring after the detection of the PSS;
monitoring PDCCH in the different SS as compared to the monitoring after the detection of the PSS and for a longer periodicity as compared to the monitoring after the detection of the PSS.

12. The method of claim 1, wherein the PSS configuration comprises a SS association and a Control Resource Set association for the PSS Monitoring Occasion(s).

13. The method of claim 1, wherein at least one of the PSS offset and the PSS length is defined based on a time duration or slot duration between the PSS MW and the ON-duration being of a length dependent on one or more WD capabilities.

14. The method of claim 1, further comprising:
transmitting a signal to the network node indicative of at least one of:
a WD type,
a WD capability,
a WD processing time,
wherein the PSS configuration is further based on at least one of the WD type, the WD capability, and the WD processing time.

15. A wireless device for communicating with a network node in a wireless communication network, the wireless device comprising:
processing circuitry configured to execute the method of claim 1.

16. A method performed by a network node for communicating with a wireless device (WD) in a wireless communication network, the method comprising:
determining a Discontinuous Reception (DRX) configuration having an ON-duration configuration and a long/short DRX cycle configuration, the DRX configuration defining a timing and length of an ON-duration for the WD;
determining a Power Saving Signal (PSS) configuration, wherein the PSS configuration comprises a PSS offset and a PSS range
and the PSS offset and the PSS range define a starting point and length of a PSS Monitoring Window (MW) within which at least one PSS Monitoring Occasion (MO) occurs; and
transmitting the DRX configuration and PSS configuration to the WD.

17. The method of claim 16, wherein the PSS range comprises a number of search space sets defining the length of the PSS MW.

18. The method claim 16, further comprising:
transmitting a PSS to the WD in accordance with the PSS configuration.

19. The method of claim 16, wherein the PSS comprises an indication of at least one of:
an instruction to monitor a Physical Downlink Control Channel PDCCH at one or more PDCCH monitoring occasions, MOs, in a subsequent ON-duration of the DRX cycle;
an instruction to trigger a MAC entity to start a DRX ON-duration timer;
an instruction to perform a Bandwidth Part, BWP, switch;
an instruction to report Channel State Information, CSI;
an instruction to perform Secondary cell, Scell, adaptation.

20. The method of claim 16, wherein the PSS is a PDCCH-based PSS, and the PSS configuration comprises an indication of an instruction to monitor the PDCCH at the one or more PSS MOs.

21. The method of claim 16, wherein the PSS MW ends at a point before the ON-duration.

22. The method of claim 16, further comprising:
receiving a signal from the WD indicative of a PSS processing time of the wireless device, wherein the PSS configuration is based on the PSS processing time of the wireless device.

23. The method of claim 16, further comprising:
receiving a signal from the WD, the signal comprising WD assistance
information, wherein at least one of the PSS offset and the PSS range is based on the WD assistance information.

24. The method of claim 16, further comprising:
receiving a signal from the WD, the signal comprising at least one of a preferred PSS offset and a preferred PSS range of the WD, wherein
the PSS offset is based on the preferred PSS offset of the WD and/or the PSS range is based on the preferred PSS range of the WD.

25. The method of claim 16, further comprising:
receiving a signal from the WD, the signal being indicative of at least one of:
a WD type,
a WD capability,
a WD processing time;
wherein the PSS configuration is further based on at least one of the WD type/types, the WD capability/capabilities, and the WD processing time.

26. A network node configured to communicate with a wireless device in a wireless communication network, the network node comprising processing circuitry configured to execute the method of claim 16.

* * * * *